US011643106B2

(12) United States Patent
Blaiotta

(10) Patent No.: US 11,643,106 B2
(45) Date of Patent: May 9, 2023

(54) MOVEMENT PREDICTION OF PEDESTRIANS USEFUL FOR AUTONOMOUS DRIVING

(71) Applicant: Robert Bosch GmbH, Stuttgart (DE)

(72) Inventor: Claudia Blaiotta, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 568 days.

(21) Appl. No.: 16/797,636

(22) Filed: Feb. 21, 2020

(65) Prior Publication Data

US 2020/0283016 A1 Sep. 10, 2020

(30) Foreign Application Priority Data

Mar. 6, 2019 (EP) .................................. 19160942

(51) Int. Cl.
| | |
|---|---|
| *B60W 60/00* | (2020.01) |
| *G06T 7/246* | (2017.01) |
| *B60W 30/095* | (2012.01) |
| *G06V 20/58* | (2022.01) |
| *G06N 7/01* | (2023.01) |

(52) U.S. Cl.
CPC .... *B60W 60/0011* (2020.02); *B60W 30/0956* (2013.01); *G06N 7/01* (2023.01); *G06T 7/251* (2017.01); *G06V 20/58* (2022.01); *B60W 2554/4029* (2020.02)

(58) Field of Classification Search
CPC ......... B60W 60/0011; B60W 30/0956; B60W 2554/4029; G06T 7/251; G06V 20/58; G06N 7/005
USPC ........................................................ 701/301
See application file for complete search history.

(56) References Cited

U.S. PATENT DOCUMENTS

| | | | | |
|---|---|---|---|---|
| 10,268,191 | B1 * | 4/2019 | Lockwood | ........... G05D 1/0038 |
| 11,124,204 | B1 * | 9/2021 | Narang | ................ B60W 30/09 |
| 2012/0232795 | A1 * | 9/2012 | Robertson | .............. G01C 21/00 |
| | | | | 706/46 |
| 2013/0271458 | A1 * | 10/2013 | Andriluka | .............. G06V 40/23 |
| | | | | 345/619 |

(Continued)

FOREIGN PATENT DOCUMENTS

| | | | | |
|---|---|---|---|---|
| EP | 3706034 A1 * | 9/2020 | ........ B60W 30/0956 |
| WO | WO-2020074921 A1 * | 4/2020 | .............. G01C 21/16 |
| WO | WO-2020143916 A1 * | 7/2020 | .......... G06K 9/00805 |

OTHER PUBLICATIONS

Pellegrini, Stefano, et al. "You'll Never Walk Alone: Modeling Social Behavior for Multi-Target Tracking." Computer Vision, 2009 IEEE 12th International Conference on. IEEE, 2009, pp. 261-268.
Luber, Matthias, et al. "People Tracking With Human Motion Predictions From Social Forces." Robotics and Automation (ICRA), 2010 IEEE International Conference on. IEEE, 2010, pp. 464-469.
Alexandre Alahi, et al., "Social LSTM: Human Trajectory Prediction in Crowded Spaces", In IEEE Conference on Computer Vision and Pattern Recognition (CVPR 2016), 2016, pp. 961-971.

(Continued)

*Primary Examiner* — Richard A Goldman
(74) *Attorney, Agent, or Firm* — Norton Rose Fulbright US LLP; Gerard Messina

(57) ABSTRACT

A prediction device is described for predicting a location of a pedestrian moving in an environment. The prediction device may have a memory configured to store a probability distribution for multiple latent variables indicating one or more states of the one or more pedestrians. The prediction device may be configured to predict a position of a pedestrian for which no position information is currently available from the probability distribution of the multiple latent variables.

20 Claims, 11 Drawing Sheets

(56) References Cited

U.S. PATENT DOCUMENTS

| | | | | |
|---|---|---|---|---|
| 2014/0171759 | A1* | 6/2014 | White | A61B 5/6835 |
| | | | | 600/306 |
| 2014/0270366 | A1* | 9/2014 | Wang | G06V 10/464 |
| | | | | 382/103 |
| 2014/0270367 | A1* | 9/2014 | Wang | G06K 9/6257 |
| | | | | 382/103 |
| 2015/0294192 | A1* | 10/2015 | Lan | G06F 16/285 |
| | | | | 382/159 |
| 2018/0005118 | A1* | 1/2018 | Kapoor | G06F 21/552 |
| 2020/0051252 | A1* | 2/2020 | Brown | G05D 1/0231 |
| 2020/0086864 | A1* | 3/2020 | Rajendra Zanpure | |
| | | | | G06V 20/56 |
| 2020/0207341 | A1* | 7/2020 | Inoue | B62D 5/0409 |
| 2020/0232806 | A1* | 7/2020 | Goldman | G08G 1/167 |
| 2020/0283016 | A1* | 9/2020 | Blaiotta | G06V 20/58 |
| 2020/0355503 | A1* | 11/2020 | Chen | G01C 19/00 |
| 2021/0150228 | A1* | 5/2021 | Goforth | G06V 10/255 |
| 2021/0181332 | A1* | 6/2021 | Yun | G01S 7/025 |
| 2021/0254979 | A1* | 8/2021 | Faragher | G01S 19/35 |
| 2021/0334982 | A1* | 10/2021 | Pradeep | G06V 20/58 |
| 2022/0204030 | A1* | 6/2022 | Nishimura | B60W 30/09 |
| 2022/0292867 | A1* | 9/2022 | Zhang | G06N 3/0481 |
| 2022/0350215 | A1* | 11/2022 | Osterhout | G02B 7/006 |

OTHER PUBLICATIONS

Arnaud Doucet, et al., "On Sequential Monte Carlo Sampling Methods for Bayesian Filtering", Statistics and Computing, 10(3), 2000, pp. 197-208.

Kaiming He, et al., "Mask R-CNN", In IEEE International Conference on Computer Vision (ICCV 2017), 2017, pp. 1-12.

Nicolai Wojke, et al., "Deep Cosine Metric Learning for Person Re-Identification", In IEEE Winter Conference on Applications of Computer Vision (WACV 2018), 2018, pp. 748-756.

Kota Yamaguchi, et al., "Who Are You With and Where Are You Going?", In IEEE Conference on Computer Vision and Pattern Recognition (CVPR 2011), 2011, pp. 1345-1352.

Blaiotta, Claudia: "Learning Generative Socially aware Models of Pedestrian Motion", IEEE Robotics and Automation Letters 4(4), (2019), pp. 3433-3440.

Klinger, et al.: "Probabilistic Multi-Person Tracking Using Dynamic Bayes Networks", ISPRS Annals of Photogrammetry, remote Sensing and Spatial Information Sci., II-3/W5 (2015), pp. 435-442.

Sarkar, et al.: "Trajectory Prediction of Traffic Agents at Urban Intersections Through Learned Interactions", IEEE Int'l Conference in Intelligent Transportation Systems (ITSC) (2017), pp. 1-8.

* cited by examiner

MOVEMENT PREDICTION OF PEDESTRIANS USEFUL FOR AUTONOMOUS DRIVING

CROSS REFERENCE

The present application claims the benefit under 35 U.S.C. § 119 of German Patent Application No. EP 19160942.9 filed on Mar. 6, 2019, which is expressly incorporated herein by reference in its entirety.

FIELD OF THE INVENTION

The present invention relates to a prediction device, a car, a training device, a computer-implemented prediction method, a computer-implemented training method, and a computer-readable medium.

BACKGROUND INFORMATION

In many fields of machine control it is vitally important to predict the future state of the environment so that the machine control may safely adapt to it. In particular, predicting the movement of pedestrians is important for controlling a physical system, like a computer-controlled machine, e.g., a robot or a vehicle, in order to ensure that, while operating, this machine interacts safely with a pedestrian that might be in its way, for instance, by not hitting them.

Other applications of prediction of pedestrian movement are in driving assistance. For example, a driver of a vehicle, e.g., a car, may be warned if a pedestrian appears to prepare for an unsafe crossing of the road. In such a case, the driver may be warned by an appropriate feedback signal, e.g., a sound, a light, a warning on a display, etc.

Existing systems such as (Pellegrini et al., 2009) or (Luber et al., 2010) are unsatisfactory. For example, these approaches neglect uncertainty inherent to sensor data and agent behavior when modelling interactions, thus considering only a very restricted hypothesis space in order to make inferences and predictions. Moreover, there is a desire for increased accuracy.

Reference is made to:
Pellegrini, Stefano, et al. "You'll never walk alone: Modeling social behavior for multi-target tracking." *Computer Vision*, 2009 *IEEE* 12*th International Conference on.* IEEE, 2009, and
Luber, Matthias, et al. "People tracking with human motion predictions from social forces." *Robotics and Automation (ICRA)*, 2010 *IEEE International Conference on.* IEEE, 2010.

SUMMARY

In accordance with aspects of the present invention, there is provided a prediction device for predicting a location of a pedestrian moving in an environment, a training device, a prediction method, and a training method. Furthermore, according to a further aspect of the present invention, there are provided computer-readable mediums, comprising instructions to perform the computer-implemented methods, and a computer-readable medium comprising data representing a probabilistic interaction model.

Embodiments according to one or more of these aspects involve modelling a pedestrian as a state comprising multiple latent variables. A probability distribution for multiple latent variables indicating one or more states of one or more pedestrians may be stored in a memory. By manipulating the probability distribution, information about a possible future value of the state can be obtained, e.g., by advancing the states. For example, a prediction may be extracted from the states for a position of a pedestrian for which no position information is currently available, e.g., for a future position of the pedestrian, or for a position of a pedestrian while he or she is occluded from sensors. The probability distribution may also be updated to bring them in closer alignment to reality, e.g., as observed through one or more sensors.

In an embodiment, a fully probabilistic interaction model for pedestrian simulation is achieved, which relies on a joint latent space representation of multiple pedestrians, and which thus allows to quantify and propagate uncertainty relative to the true state of the multi-agent system.

Embodiments according to one or more of these aspects comprise determining the advanced probability distribution of the multiple latent variables from at least the position information of one or more vehicles in the environment. Interestingly, embodiments allow that for some agents, e.g., pedestrians, probability information is stored and manipulated, whereas for other agents, e.g., cars, no probability information is needed. This allows for a fine grained control of resources. It was found that pedestrians are less predictable, and that investing resources in probability information pays off. Whereas cars are more predictable, and their future behavior can usually be predicted with fewer means, e.g., by extrapolation position based on current position and velocity. Other traffic agents, e.g., cycles, motor cycles, etc., can be modelled with or without probabilistic information. Note that in an embodiment, one or more cars may also be modelled probabilistically.

The prediction system may be connected or connectable to a sensor system. The prediction system and sensor system may be part of the same device, e.g., a car. For example, the car may use pedestrian predictions for driver feedback and/or for autonomous driving. The prediction system may also be independent from the sensor system. For example, professionals in the field of autonomous driving may use the prediction device to clean up training data for other purposes. For example, position tracks of traffic agents may be incomplete, e.g., due to occlusion, measurement accuracy, or recognition failure. The prediction device may interfere and/or predict the missing data based on the pedestrian model and/or correct inaccurate data. As a result an improved position track of traffic agents, e.g., of pedestrians is obtained. The improved position track may be used for training or testing purposes. For example, an autonomous driving unit is preferably tested with replayed tracks before testing in life traffic situations.

The sensor signal that may be used to update the probabilistic information typically comprises positions and/or velocities of pedestrians. It has been found that the measured data may be enriched with orientation information of pedestrians. In particular, the orientation of the body and/or of the head, and preferably of both. For example, a perception pipeline configured to process raw sensor information may produce as output pedestrian positions but also orientations. Moreover, it was found that orientation of a pedestrian may give information on a level of awareness and/or of an intention of the pedestrian, e.g., an awareness of an oncoming car, or an intention to cross a road. It was found that taking this additional information into account increases the accuracy of the predictions. Interestingly, a comparable accuracy was reached for some prediction situations, however, with the difference that a prediction device according to an embodiment can reach this accuracy without requiring information about a goal of the pedestrian. Since in actual driving situations, typically, a goal of the pedestrians in an environment of the car is not available, this is an important advance.

It has been found that several advances in modelling were beneficial to pedestrian modelling, in particular to benefit from the additional information. For example, one or more of the latent variables that represent a pedestrian state may be a discrete variable, in particular, a binary variable. The binary variable may represent such information as awareness and/or crossing intention. Another use of a discrete variable is to model a movement state, e.g., stopping versus walking. A different motion model may be switched in dependence on the movement state. Additional movement states are possible, e.g., running. The same option may be applied to other traffic agents, e.g., movement states of cars, cyclists, motorcyclists, etc.

There is furthermore a desire to include semantic information in the model. It has been found that this can be achieved by adding a map to the model, and making the advancement of the probabilistic information dependent upon the map. For example, a geometric relationship between a pedestrian and an object on the map, e.g., a traffic infrastructural object may be a feature in an advancement function, e.g., as part of a feature vector. The traffic infrastructural object may include: a crossing, e.g., a zebra crossing, traffic light, a road, e.g., a car-road, a cycle-path, etc. The geometric relationship may comprise a distance between the objects, or an orientation between the objects.

Embodiments of the prediction method or device described herein may be applied in a wide range of practical applications. Such practical applications include autonomous driving, driver assistance, and pedestrian data manipulation. The prediction device and the training device are electronic devices.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the present invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the present invention are described herein, by way of example only, with reference to the figures. Elements in the figures are illustrated for simplicity and clarity and have not necessarily been drawn to scale. In the Figures, elements which correspond to elements already described may have the same reference numerals.

FIG. 6b(b) schematically shows the inferred position at the last observed time-step.

FIG. 6b(c) schematically shows the posterior probability of crossing intention along the track.

FIG. 6b(d) schematically shows the predicted position at two seconds in the future.

LIST OF REFERENCE NUMERALS

Figure 1A:
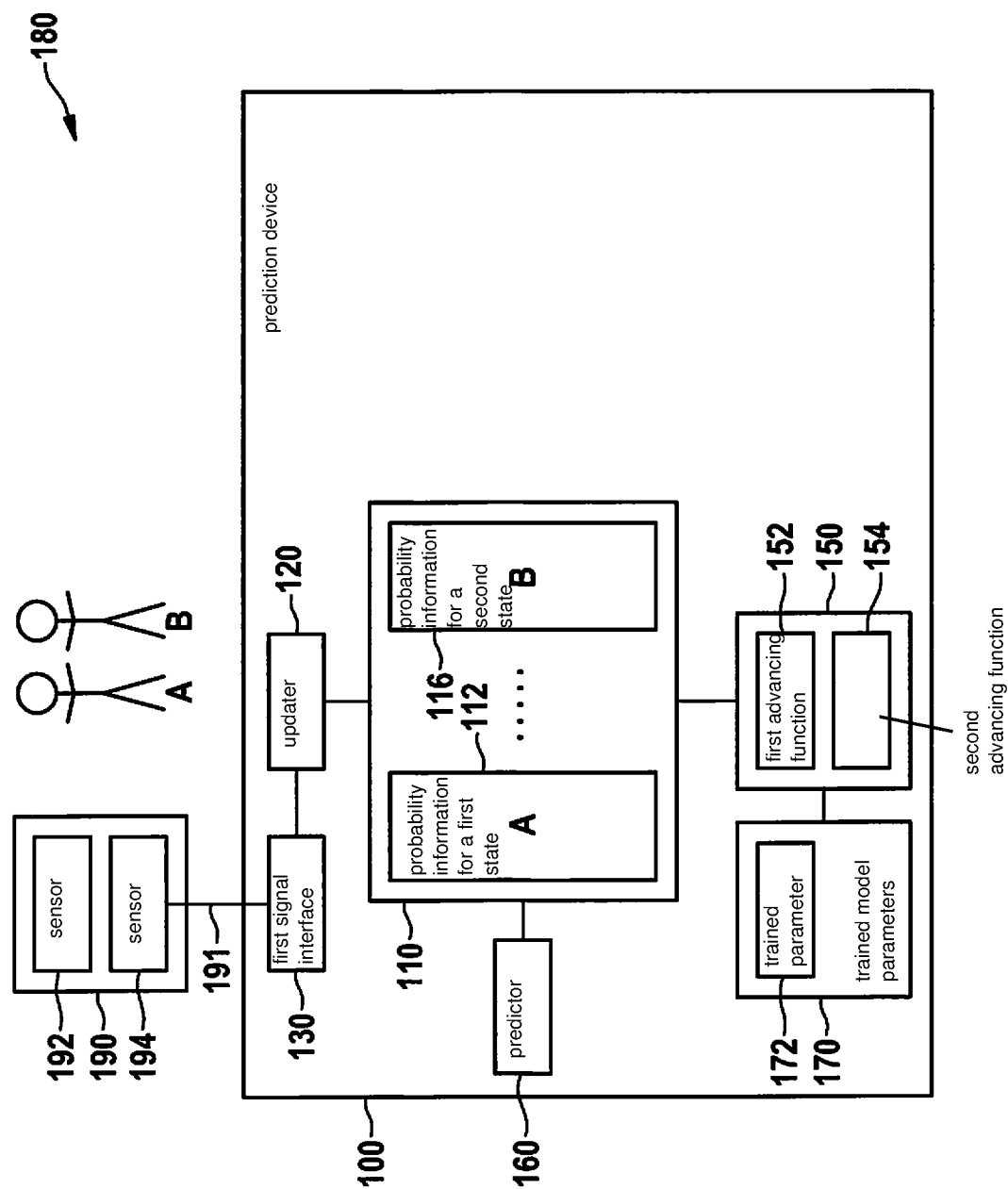
FIG. 1a schematically shows an example of an embodiment of a prediction device for predicting a location of a pedestrian moving in an environment.

A, B pedestrian
C car
100 prediction device
110 primary state memory
112 probability information for a first state
116 probability information for a second state
120 an updater
130 a first signal interface
132 a second signal interface
140 secondary state memory
142 state
143 a map storage
150 an advancer
152 a first advancing function
154 a second advancing function
160 a predictor
170 trained model parameters
172 a trained parameter
180 environment
190 sensor system
191 sensor signal
192, 194 sensor
193 a vehicle signal
210 primary state memory 212 probability information for a state
213 probability information for a latent variable
214 probability information for a latent variable
216 probability information for a state
217 probability information for a latent variable
218 probability information for a latent variable
219 a value for a latent variable
230 a top view of a person
231 a top view of a head of a person
232 an orientation of a head
233 a top view of a body of a person
234 an orientation of a body
240 secondary state memory
242-246 a variable value
300 a map
301 a building
302 a side walk
312 a traffic light
314 a zebra crossing
320 a road
400 a car
410 a driving unit
422 a feedback unit
424 an actuator
500 a probabilistic interaction model
510 a first layer
520 a second layer
530 a third layer
542 an attention part
544 an intention part
546 a motion part
550 a time step t
551 a time step t−1
561 a position and/or velocity vehicle variable
562 a binary attention variable
563 a binary intention variable
564 a binary stop/walk variable
565 a body and/or head orientation variable
566 a motion variable
567 a position and/or velocity measurement
568 a body and/or head orientation measurement
600 a car
610 webcams
611 IMU
612 LIDAR
613 Stereo-RGB
614 radar
615 mono-rgb
700 training device
710 primary state memory
712 probability information for a first state
716 probability information for a second state
720 an updater
730 a first training interface
732 a second training interface
740 secondary state memory
742 state
743 a map storage
750 an advancer
760 an estimator
762 an optimizer
770 model parameters
772 a parameter
790 concurrent position tracks
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EXAMPLE EMBODIMENTS

While the present invention is susceptible of embodiments in many different forms, there are shown in the figures and are described in detail specific example embodiments, with the understanding that the present disclosure is to be considered as exemplary of the features of the present invention and not intended to limit the present invention to the specific embodiments shown and described.

In the following, for the sake of understanding, elements of embodiments are described in operation. However, it will be apparent that the respective elements are arranged to perform the functions being described as performed by them.

Further, the present invention is not limited to the embodiments, and the present invention lies in each and every novel feature or combination of features described herein.

Figure 4:
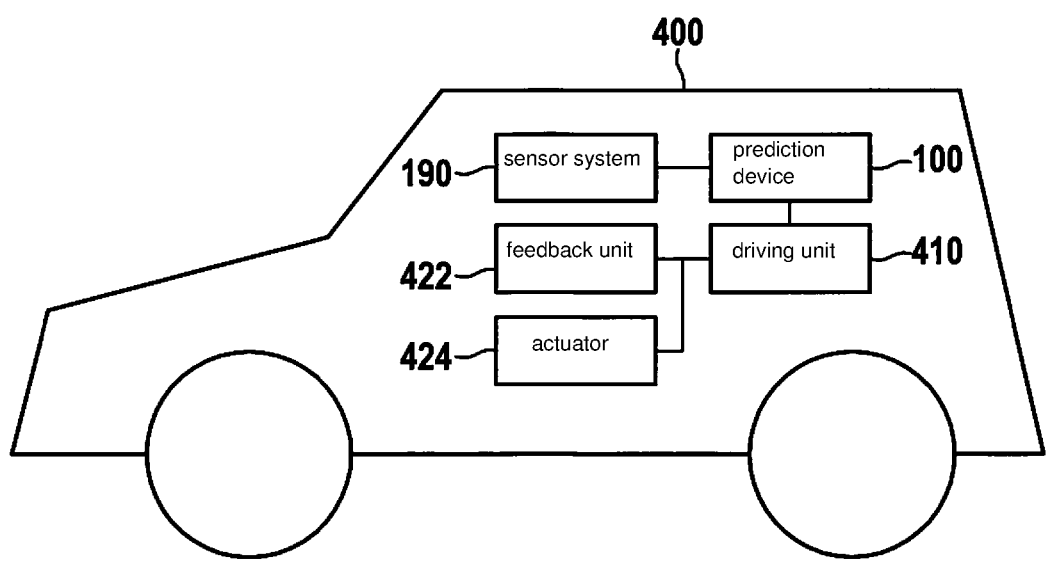
FIG. 4 schematically shows an example of a car.

FIG. 4 schematically shows an example of a car 400. Car 400 comprises a sensor system 190. Sensor system 190 comprises one or more sensors and is configured to generate a sensor signal. Car 400 comprises a prediction device 100. Prediction device 100 is configured to predict a location of pedestrians moving in an environment around car 400. For example, sensor system 190 may measure a number of features of pedestrians in the car's environment. For example, sensor system 190 may obtain a position and/or a velocity of the pedestrians. It was an insight that future predictions may be improved by taking into account further measurable information; For example, sensor system 190 may obtain a body and/or head orientation of said pedestrians. Measured information may include information on other agents in the environment, e.g., other vehicles such as other cars. The behavior of the other vehicles may be modeled in the same model as the modelled pedestrians or they may be modelled in a different manner.

Prediction device 100 predicts, e.g., a future location of the pedestrians. As desired, prediction device 100 may also predict other aspects, e.g., a future velocity.

The various parts, e.g., devices, units, systems of car 400 may communicate with each other over a vehicle bus, or a computer network, or the like. A computer network may be wholly or partly wired, and/or wholly or partly wireless. For example, the computer network may comprise Ethernet connections. For example, the computer network may comprise wireless connections.

Car 400 is configured to provide driving assistance and/or is configured for autonomous driving in dependence upon location predictions obtained from prediction device 100 for a pedestrian in an environment around the car. For example, car 400 may comprise a driving unit 410. Driving unit 410 is configured to generate a driving signal based on at least the location predictions of pedestrians of device 100. Driving unit 410 may also take into account other information, in particular the current state of the car, e.g., the current location and velocity, e.g., the current destination of the car, etc. The driving signal may be transmitted to a feedback unit 422. Feedback unit 422 may be configured to provide driving assistance to an operator of car 400. For example, a driver of a vehicle, e.g., a car, may be warned if a pedestrian appears to prepare for an unsafe crossing of the road. For example, the operator may be warned if the current course of the car and a likely future location of the pedestrian may result in a collision. In such a case, the driver may be warned by an appropriate feedback signal, e.g., a sound, a light, a warning on a display, etc. As a result of the feedback signal, the driver is instructed to change the operation of the vehicle, e.g., by reducing speed, or by stopping the vehicle, etc.

In addition to feedback unit 422, or alternative to it, car 400 may comprise an actuator 424. Actuator 424 is configured to control at least part of the car's driving machinery. For example, actuator 424 may be configured to increase or decrease speed and/or to alter the course of the car. For example, actuator 424 together with prediction device 100 and possibly further driving logic, may be configured for full or partial autonomous driving. For example, the driving signal may instruct actuator 424 to reduce speed and/or alter the course of the vehicle if the risk of a collision with a pedestrian is above a threshold. Instead of a car, another type of motorized vehicle may be used, e.g., a motorcycle.

There are other applications for prediction device 100 for which the device does not need to be included in a car. For example, prediction device 100 may be usefully employed by in the field of machine learning, e.g., to prepare data for training of other devices. For example, a prediction device such as prediction device 100 may be used to clean measured data, e.g., to infer, e.g., predict intermediate position of pedestrians. Cleaned-up data may be used, e.g., for machine learning of other device, e.g., driving units, object recognition units, and the like. Nevertheless, for simplicity prediction device 100 will be described with reference to car 400, with the understanding that prediction device 100 need not necessarily be included in a car.

FIG. 1*a* schematically shows an example of an embodiment of a prediction device 100 for predicting a location of a pedestrian moving in an environment 180. Shown in environment 180 are two pedestrians A and B. There may be more or fewer pedestrians than two in the environment. Prediction device 100 is configured for predicting a location of one or more pedestrians moving in an environment 180. The prediction device cooperates with a sensor system 190. For example, prediction device 100 may comprise a signal interface 130 for obtaining a sensor signal 191 from sensor system 190. Sensor signal 191 may comprise at least position and may additionally comprise velocity and orientation information of one or more pedestrians in environment 180. An embodiment may receive input signals from a perception data processing pipeline, which process raw sensor data, e.g., image, lidar, or radar data, etc., in order to extract measurements, e.g., position, velocity and orientation measurement, of agents in a dynamic scene, e.g., of pedestrians. Other agents may include cyclist, motorcyclists, etc.

For example, prediction device 100 may receive sensor signal 191 from sensor system 190. In an embodiment, the sensor system may comprise multiple sensors, possibly of different sensor modalities; shown in FIG. 1*a* are two sensors: sensor 192 and sensor 194. For example, the sensors may include an image sensor, e.g., a camera, and a radar.

In an embodiment, device 100 and/or device 190 comprises a processing unit for processing a raw sensor signal, e.g., a raw sensor signal as directly received from the sensors. The raw sensor signal may be signal processed, e.g., filtered, etc. Objects may be recognized and tracked in the raw sensor signal. For example, a trained object recognition unit may recognize objects, e.g., pedestrians, vehicles, cars, etc., in the signal. For example, the trained object recognition unit may comprise a neural network. From the raw signal various aspects are obtained, e.g., measured, at least for a pedestrian in the environment. Prediction device 100 may also modify the number of modelled agents, e.g., the number of states in memory 110, based on the information obtained, e.g., to add or remove states as pedestrians appear or disappear.

In an embodiment, sensor signal 191 comprises at least a location for the one or more pedestrians. In an embodiment, sensor signal 191 further comprises a velocity for the one or more pedestrians. It is not necessary that all pedestrians are included in the signal. For example, pedestrians that are sufficiently far removed, e.g., from car 400, may be ignored. Furthermore, the signal may occasionally be imperfect, for example, for one or more pedestrians occasionally signal 191 may not have information. For example, a pedestrian may be temporality obscured from sensor system 190.

Interestingly, it has been found that an important improvement in prediction accuracy may be obtained by including in the signal orientation information of the pedestrian, e.g., a body orientation and/or a head orientation, preferably both. FIG. 2*c* schematically shows an example of an embodiment of a head orientation and body orientation. Shown in FIG. 2*c* is a top view of a person 230; shown is the person's head 231 and body 233. The orientation of the body and head is indicated by dashed lines 234 and 243 respectively. For example, the orientation may be expressed as an angle, e.g., an angle of dashed lines 234 and 243 with a reference line. The reference line may be a virtual line in the environment, e.g., on a map, or with respect to car 400, etc. Body orientation and/or a head orientation may be derived from raw sensor data, e.g., in sensor system 190 or in device 100, e.g., joined with interface 130. For example, a machine learning unit may be used for this purpose, e.g., a neural network, a SVM.

Object detection, recognition, permanence, etc., and/or the derivation, e.g., measuring of aspects of vehicles and/or pedestrians may use conventional technologies, and is not further explained herein. Prediction device 100 may operate using only location of pedestrians or using only location and velocity information. However, it has been found that a marked improvement is obtained when orientation of pedestrians is taken into account. For example, orientation may be modelled in a pedestrian state by two circular orientation variables encoding head and body orientation of the agent. Likewise, position and velocity may be represented as two 2-dimensional continuous variables, Returning to FIG. 1*a*. The execution of prediction device 100 is implemented in a processor system, examples of which are shown herein. The figures, e.g., 1*a*, 1*b*, 2*a*, 2*b*, and 7 show functional units that may be functional units of the processor system. For example, FIG. 1*a* may be used as a blueprint of a possible functional organization of the processor system. The processor system is not shown separate from the units in the figures. For example, the functional units shown in the figures may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., signal processing or machine learning coprocessors, etc., and partially in software stored and executed on device 100.

Prediction device 100 may model a pedestrian as a state comprising multiple latent variables. A latent variable is a variable which cannot be measured or which can only be measured costly or inaccurately. A latent variable may also represent a better estimate of a measured quantity, e.g., to cope with an unknown measurement accuracy. For example, a latent variable may represent an unknowable awareness indication. For example, a latent variable may represent a position. In the latter case, the latent variable is latent since corresponding measurements might be missing, e.g., by occasional occlusion that prevents measurement, and since the latent variable attempts to correct for measurement inaccuracy.

A state may describe a pedestrian. For example, a state may include such variables as position, velocity, orientation etc. But may also include variables that describe aspects such as the person's current awareness, or his goals, e.g., his destination, or the intention to cross a road, etc. Prediction device 100 may comprise a memory 110 configured to store a probability distribution for multiple latent variables in the form of one or more samples from the distribution for the one or more pedestrians. For example, memory 110 may store a first state for pedestrian A and a second state for pedestrian B. The state of the pedestrians may be used to predict a pedestrian's future behavior. The measurements obtained from sensor system 190 may be used to update the state, e.g., to improve the alignment between the states and reality, e.g., in other words that predictions obtained from the states are close to the actual future behavior of the pedestrians.

Some of the latent variables, e.g., position or velocity, have a clear correspondence to actual physical manifestations. It is noted that some of the other latent variables, e.g., awareness or intention variables may or may not correspond to an actual physical manifestation as such in the pedestrian. This is not a problem though; an awareness variable may act in a model to model that a person has a decreased likelihood for some action. For example, a person who is aware of an oncoming car is less likely to step in front of it. Exactly, how the awareness variable influences this likelihood or how the awareness variable develops over a time, is learned by the model. The important point is that introducing an awareness variable increases modelling accuracy, rather than whether or not an awareness variable corresponds to a physically observable property.

Likewise an intent variable need not necessarily correspond with a conscious intent of the person, but is a rather a concise summary that the person has an increased likelihood for some action. For example, a crossing variable may increase the likelihood that the person will step onto the road. Typically, intent variables model intention with a short time horizon, e.g., within 1 or 2 or 10 seconds, rather than long term goals, e.g., a destination of a pedestrian. Moreover, in an embodiment the value of an awareness and/or intent variable is deduces from observed data through learnt functions rather than provided to the model.

Since, typically the exact value of the latent variables is unknown, prediction device 100 stores an estimation of them. In fact, modelling is further improved when a probability distribution is stored for one or more or all of the latent variables. For example, a latent variable may be modelled by storing a probability distribution for it. The probability distribution indicates the likelihood for different values. Further improvement in modelling accuracy is obtained by storing a joint probability distribution. For example, a joint probability distribution may be modelled by storing many collections of concurrent values of the latent variables for all agents. A weight may indicate the likelihood of a collection.

Figure 2A:
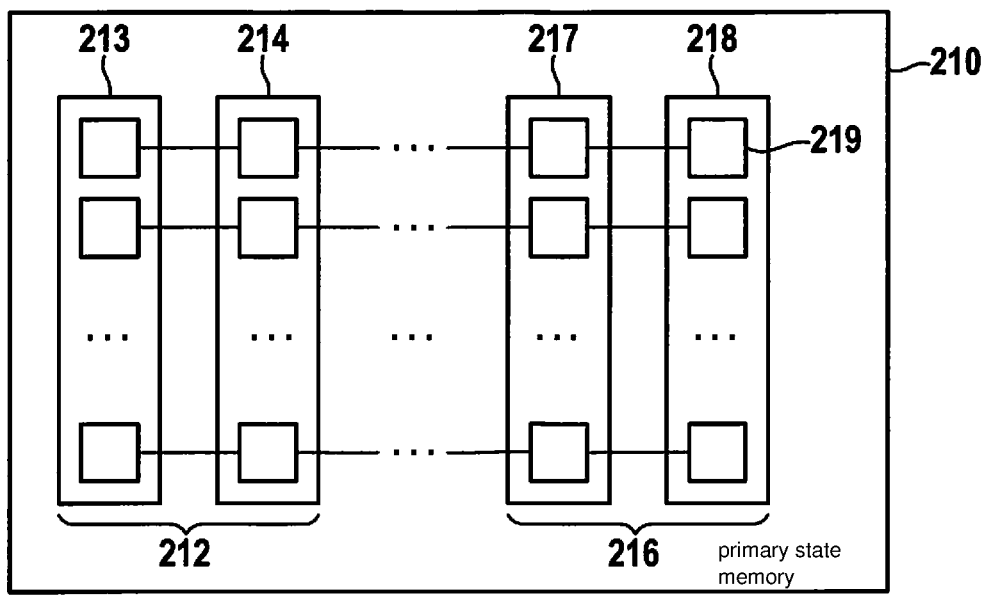
FIG. 2a schematically shows an example of an embodiment of a memory configured to store a probability distribution for multiple latent variables.

FIG. 2a schematically shows an example of an embodiment of a memory 210 configured to store a probability distribution for multiple latent variables. Memory 210 stores multiples states for multiple pedestrians. Each state may comprise multiple latent variables. For example, a first state modeled by information 212 may comprise two variables, modeled by information 213 and 214, and a second state modeled by information 216 may comprise two variables, modeled by information 217 and 218. There may be more or fewer than two states and they may have more or fewer than two variables.

Memory 210 stores information on the states and on the latent variables. Instead of storing a single value, or a single estimate, memory 210 may store probability information.

For example, memory 210 may comprise probability information for a state 212 and a probability information for a state 216, e.g., probability information for the variables of the states. Preferably, the probability information is joint probability information, although this is not needed. One way to model joint probability information is shown in FIG. 210.

FIG. 210 shows individual values of a variable with small square boxes, one of which has numeral 219. On the vertical axis one can see multiple possible values for a variable. For example, for variable 218, the vertical axis shows several squares indicating several possible values. It is not needed that every possible value is represented, and typically some possible values are represented multiple times. Horizontally, and indicated with horizontal connecting lines are shown in FIG. 210 possible concurrent collections. Thus, the boxes for variables 213, 214, 217 and 218, connected horizontally show a concurrent set of values that these variables may have. The collections thus sample the joint probability distribution. A collection may have a weight (not separately shown in FIG. 210) that indicates the likelihood of a particular concurrent set off values for a variable.

In this way, one can efficiently represent a joint probability distribution by storing a number of concurrent values for the variables, possibly together with a weight. Note that probability information may be represented in many other ways. For example, one may represent a variable with an average value and a variance. Joint probability information may be represented with a covariance, etc.

The joint probability function of the states may be represented as a number of samples of the probability density. These samples may be stored as multiple pairs of a weight and a collection of variables values corresponding to the same sample of the joint probability function. Two major stages can be distinguished: advance and update. During advancement, each collection is modified according to a state model, which may include the addition of random noise. In the measurement update stage, each collection's weight is re-evaluated based on the new data. A resampling procedure may be used to help in avoiding degeneracy by eliminating collections with small weights and replicating collections with larger weights. The number of collections may be hundreds, thousands, or even more.

Prediction device 100 may comprise an advancer 150 configured to advance the probability distribution of the multiple latent variables to a next time step. In a sense the probability distribution that encodes modelled information about the latent variables is extrapolated to a next time step. The advancing may comprise applying a trained probabilistic interaction model 170 which models conditional independencies among the latent variables. The trained probabilistic interaction model may comprise multiple functions to advance the latent variables. Advancer 150 shows two such functions: function 152 and 154. The functions are in part generic but are made specific by the trained parameters 170, e.g., parameter 172.

In an embodiment, the interaction model may be a directed acyclic graphical models (DAGs), e.g., used to build a Bayesian generative network that serves to encode the motion dynamics of a multi-agent system. In an embodiment, the probabilistic interaction model is a Bayesian network. In order make inferences an embodiment can exploit sampling based inference schemes, e.g., sequential Monte Carlo algorithms.

Given the current best estimate for the latent variables, e.g., as represented in the probabilistic information, the model computes the best estimate for the latent variables for a different time step, e.g., a next time step. The granularity of the system may be chosen in dependence on, e.g., the available computing power, the speed of car 400, the speed of sensors 190, etc.

Figure 5:
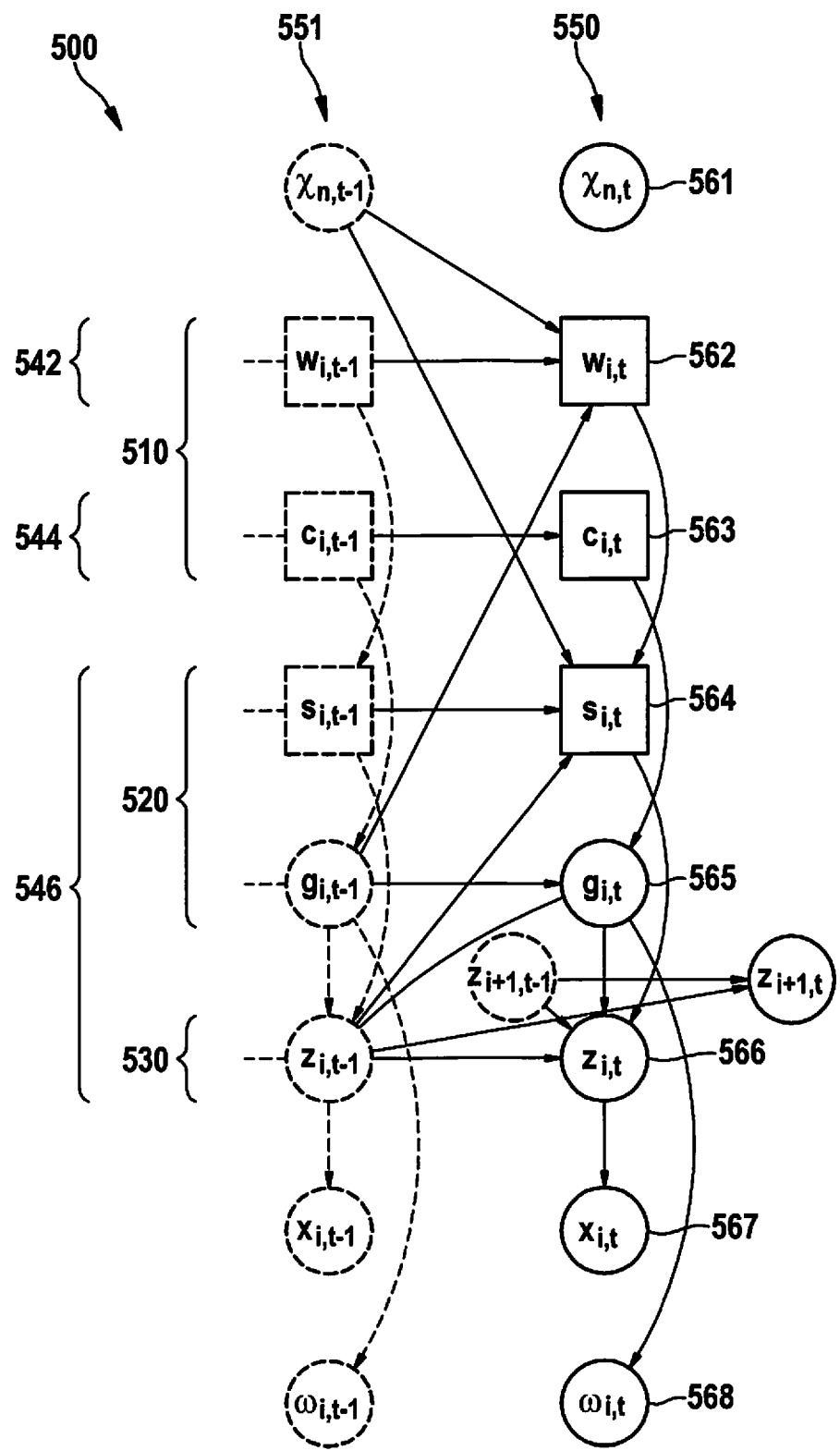
FIG. 5 schematically shows an example of a probabilistic interaction model.

The formalism of directed acyclic graphical models, also known as Bayesian networks, allows to compactly represent joint probability distributions over multi-dimensional spaces by specifying a set of conditional independencies among the modelled variables, which can be mapped uniquely to a directed graph structure. An example is shown in FIG. 5, further discussed below.

The models may be used for inference and prediction tasks, where inference indicates the process of computing probability distributions of the latent variables conditioned on the value of observable variables, e.g., the measurements, while prediction tasks involve evaluating the probability of observations that have not yet been made conditioned on the available measurements.

The parameters 170 of the model are obtained by training, for instance via maximum-likelihood estimation, e.g., the expectation-maximization algorithm or its stochastic variants. For example, training may alternate between solving the inference problem and optimizing the expectation under the inferred state posterior of the joint likelihood of the model with respect to unknown parameters.

Prediction device 100 further comprises an updater 120. Updater 120 is configured to update the advanced probability distribution in dependence on at least the position and orientation information of the one or more pedestrians obtained from the sensor signal. For example, a collection of latent variable values and its associated weight may be judged to be unlikely in light of the observed measurement. In reaction, its weight may be reduced, or the collection may be removed from memory 110 or 210. On the other hand, a collection of variable values that appears to be more likely, may have its weight increased, or may have it collection copied so that it is represented twice (or more). The latter allows a more precise representation of this likely part of the joint probability space.

Prediction device 100 further comprises a predictor 160 configured to predict a position of a pedestrian for which no position information is currently available from the sensor system from the probability distribution of the multiple latent variables. For example, predictor 160 may compute an expected value for one of the variables in the state. For example, a position may be predicted by computing an expected value for a latent position variable. Predictor 160 may use advancer 150 to compute likely values for the latent variable for a future time step.

For example, predictor 160 may draw samples from the predictive distribution, that is the probability distribution of future states, for instance at time-step t+T, conditioned on the series of past measurements up to time-step t. Such predictive distribution may be computed by multiplying the posterior state distribution evaluated during the inference phase with the state transition densities. For example, for predicting T time-steps ahead the state transition model may be applied recursively T times and finally marginalizing, e.g., integrating, out the intermediate hidden state variables.

Figure 1B:
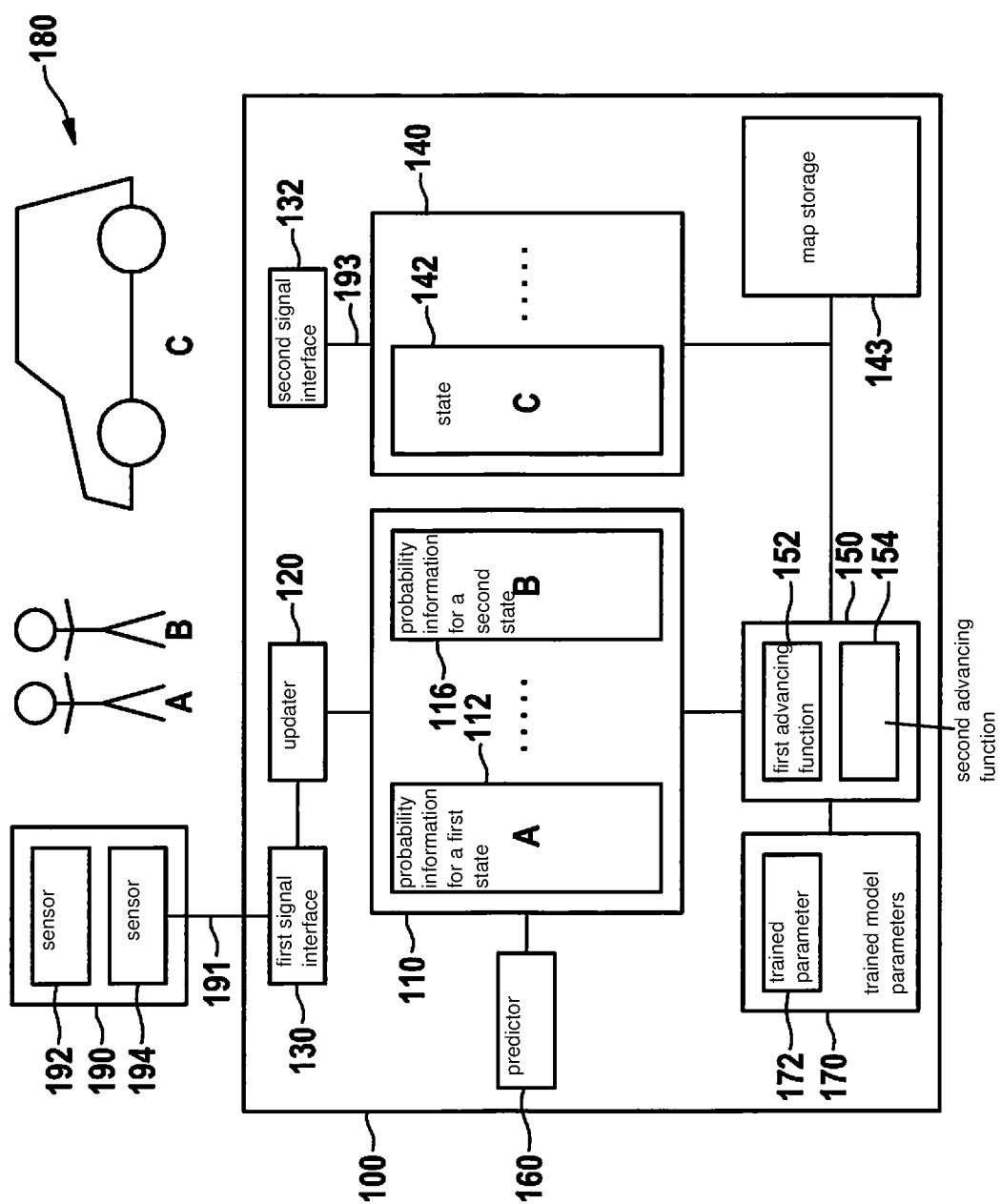
FIG. 1b schematically shows an example of an embodiment of a prediction device for predicting a location of a pedestrian moving in an environment.

FIG. 1b schematically shows an example of an embodiment of a prediction device 100 for predicting a location of a pedestrian moving in an environment. Prediction device 100 illustrated by FIG. 1b is similar to that of FIG. 1a, but a number of optional improvements are added.

Figure 2B:
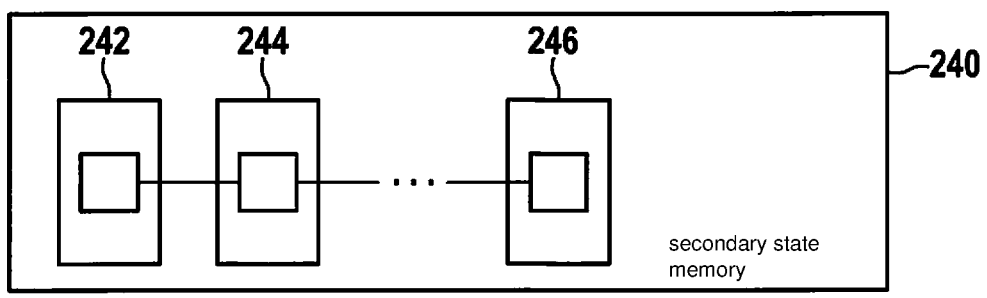
FIG. 2b schematically shows an example of an embodiment of a memory configured to store multiple variables.
Figure 2C:
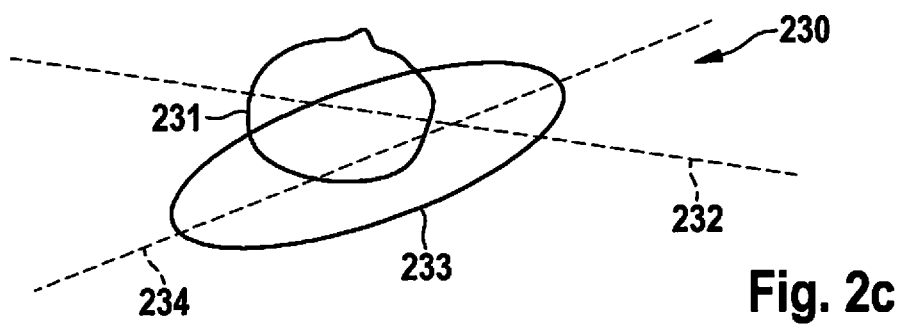
FIG. 2c schematically shows an example of an embodiment of a head orientation and body orientation.

This prediction device has the additional possibility to use one or more variables without probabilistic information. To distinguish between the two options, memory 110, which stored probabilistic or joint probabilistic information is referred to as primary memory 110. A second memory, the secondary memory 140 is used to store variables without probabilistic information. For example, in the modelled environment 180, there may be a car C. The behavior of car C could have been modelled with probabilistic information in primary memory 110, in a similar manner as the pedestrians. However, one may also assume that the behavior of car C can be described by variables without probabilistic information. For example, a state for another car may be described by a position and a velocity. For example, car C may be modelled by state 142. FIG. 2b schematically shows an example of an embodiment of a memory 240 configured to store multiple variables. In secondary memory 240, multiple states are modelled by multiple variables, shown are variables 242, 244 and 246. In this case, only a single joint value of the variables is needed to represent the behavior of these agents, e.g., cars. The secondary memory could be used to represent other agents, e.g., cyclist, motorcyclists, and the like. The use of a secondary memory has the advantage that advancing and updating the states is faster and requires less memory; secondary memory 240 may use less memory per state than primary memory 210. Furthermore, no advancing functions are needed to advance the type of variables that describe these agents, e.g., no advancing functions are needed to model.

Based on the information obtained, e.g., signal 193, the number of agents modelled in secondary memory 140 may increase or decrease, e.g., as cars appear or disappear.

Prediction device 100 may comprise a vehicle signal interface 132 configured to obtain a vehicle signal 193. The vehicle signal comprising at least position information of one or more vehicles in the environment. For example, the vehicle signal may be received from sensor system 190 or obtained therefrom, e.g., as sensor signal 191 may be. For example, a perception pipeline may use raw sensor values, to estimate such aspects of an agent as position and/or velocity, and/or orientation. The latter primarily for a pedestrian. One way to use this information in device 100, is to use the position and/or velocity etc. for pedestrians in an updater 120 to adapt the probabilistic information, but to store this information without probabilistic information in secondary memory 140. Secondary memory 140 may also have an advancer, e.g., to advance position based on a past position and a velocity, e.g., to account for an occlusion. However, the difference with advancer 150 is that such an advancer would move from one definitive estimate to another without modelling probabilistic information.

Interestingly, the trained probabilistic interaction model may use the states of non-pedestrian agents in the secondary memory 140 to advance the probability distribution of the multiple latent variables in the primary memory 110. For example, advancer 150 may be configured to determine the advanced probability distribution of the multiple latent variables from at least the position information of one or more vehicles in the environment obtained from the vehicle signal.

Another improvement is the adding and use of semantic information about the environment. For example, prediction device 100 may comprise a map storage 143. Map storage 143 may store a map, e.g., a digital representation of environment 180 on which objects in the environment are digitally represented. In particular objects that are relevant to the advancement of the latent variables may be represented in the map. For example, objects that influence how a latent variable may develop over time, e.g., as modelled by one or more advancing functions, which in turn are dependent on one or more trained parameters. For example, a model may learn that the likelihood of a person crossing a nearby road, e.g., as modelled in a crossing intent variable, may increase as the person approaches a crossing.

Figure 3:
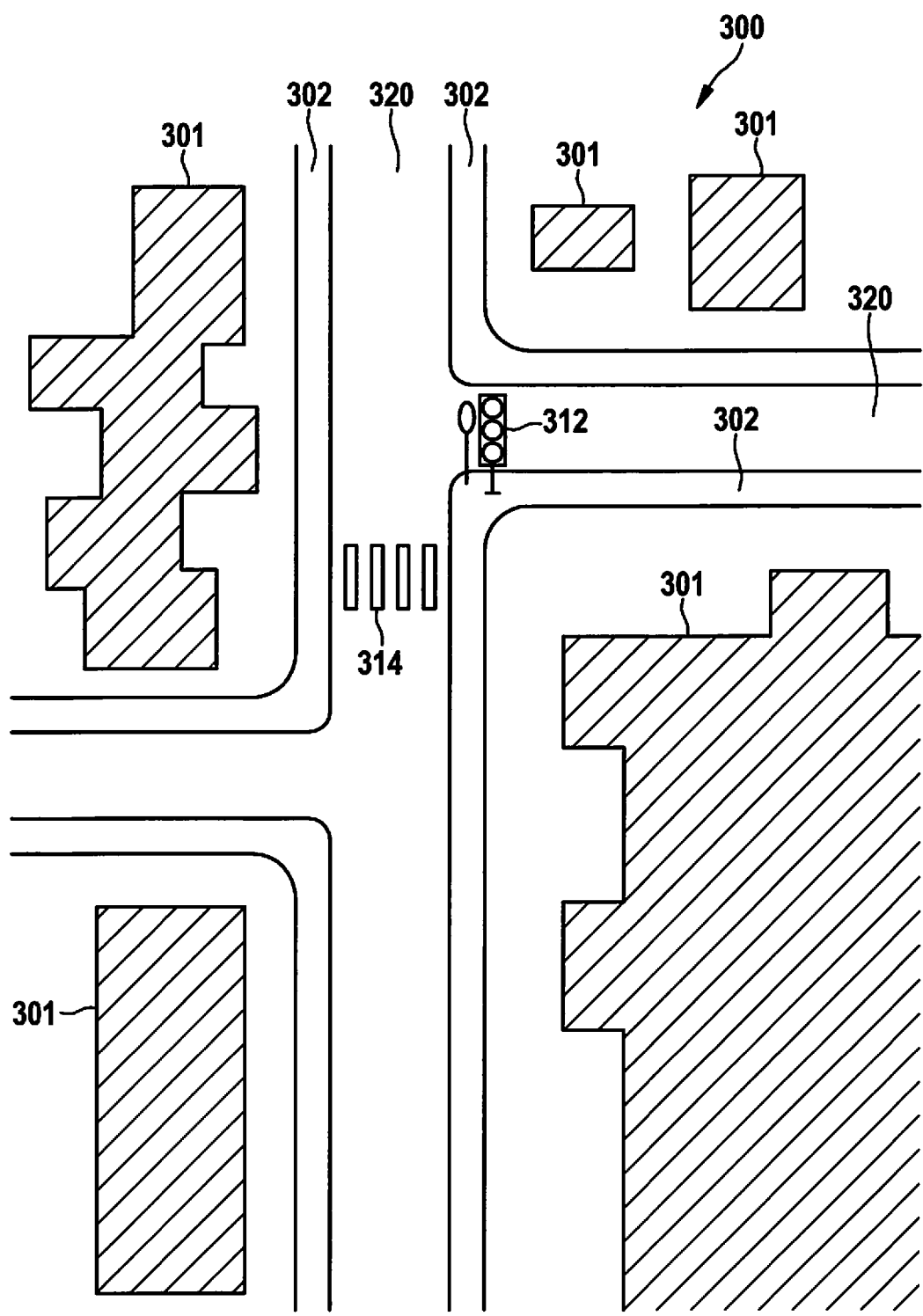
FIG. 3 schematically shows an example of a map.

FIG. 3 schematically shows an example of a map 300. For example, shown in map 300 are a number of buildings 301, a number of sidewalks 302. Furthermore, also shown in FIG. 300 is a zebra crossing 314 and a traffic light 312. One may expect for example, that a crossing likelihood will increase when a pedestrian is close to zebra crossing 314. Exactly how this event will influence the development of crossing likelihood may be learned from data and modelled in an advancing function/model parameter.

For example, in an embodiment, prediction device 100 may be configured to obtain a map 300 of the environment. For example, map 300 may be provided in a memory of prediction device 100. For example, map 300 may be downloaded, e.g., from the cloud as needed. Map 300 may even be constructed from sensor data as needed.

Prediction device 100, e.g., advancer 150, may be configured to determine a feature from a position of a pedestrian with respect to a position of the object, wherein the advanced probability distribution of a latent variable is computed from the feature. For example, the feature may be a distance between a pedestrian and the object, e.g., or an angle between a pedestrian orientation and the object. For example, the distance or orientation towards a crossing, such as a zebra crossing.

It was found that current modelling technology was insufficient for some improvement to pedestrian prediction. A number of advances in this field had to be made to gain an improvement in predictions.

For example, the conventional systems typically only keep track of continuous variables that model position and/or velocity of a pedestrian. However, in an example embodiment of the present invention, one or more of the latent variables in a state, e.g., a state describing a pedestrian may be a discrete variable, in particular a binary variable. For example, an advancing function to advance the probability distribution of a discrete latent variable may comprise applying a function to the discrete latent variable, the function depending on one or more trained parameters. A binary variable has the interesting consequence that modelling such a binary variable with probability information may be used to efficiently model a likelihood. For example, a binary variable may be used to model a crossing intention. The binary variable, may be 0, e.g., meaning that the pedestrian has no intention to cross, e.g., to cross a road, or 1, e.g., meaning that the pedestrian fully intends to cross the road. Interestingly, by keeping probabilistic information, this variable may be regarded automatically as a fuzzy state in between these two extremes. For example, an expectation of the crossing intention may be computed, and may have a value between 0 and 1. See, for example, FIG. 6$b(c)$ which graphs the crossing intention for one particular pedestrian. For example, suppose in FIG. 210 that variable 213 is a binary variable. In the case, the vertical stack of boxes under reference 213 may each comprise a 1 or a 0; this makes for efficient computing and representation. Nevertheless, together these values may be used to compute an expected crossing intent.

In an embodiment, a state of a pedestrian comprises a binary context awareness variable indicating whether the pedestrian is paying attention to the behavior of vehicles. The state transition for the awareness variable may be parameterized as a logistic sigmoid model with categorical autoregressive predictors as features plus an additional feature that summarizes the attentional state of each agent. For instance, this additional feature can be computed as the angular displacement between the agent's head pose and the relative position vector of the agent with respect to a vehicle, e.g., an ego-vehicle.

In an embodiment, a state of a pedestrian comprises a binary intention variable indicating the pedestrian's intention to cross the road or not. The crossing intention variable may use a discrete state transition probability table and additionally may take into account semantic information by computing the distance between the most recent agent's position and the closest zebra crossing, such that, if this distance is lower than a predetermined threshold, the model increases the probability of the agent intending to cross by a factor.

In an embodiment, a state of a pedestrian comprises a binary walk/stop variable indicating a switch between a non-zero velocity and zero velocity of the pedestrian. The walk/stop nodes of the network may compute the probability of its next state via a logistic sigmoid function with categorical autoregressive features plus a criticality feature. The criticality feature may be calculated, using both the relative position and velocity of the agent at time t−1 with respect to each vehicle, including an ego-vehicle (for example the distance at the closest point of approach assuming that agents move under a constant velocity model can be used). In addition the criticality feature may be linearly rescaled by the value of the agent's awareness state, such that if the agent is aware at the current time-step the is more likely to stop in case the interaction with the vehicle is critical.

A second improvement that may be employed in a model, e.g., in addition or not to binary variables, is to comprise multiple motion models in the probabilistic interaction model. A different motion model may be configured to advance the probability distribution for a motion variable in the state of a pedestrian in a particular way. For example, a different motion model may comprise one or more different advancing functions for one or more of the latent variables. Which motion model to use in a particular situation, may depend on a discrete latent variable.

For example, a different motion model may be used if a binary variable is zero or if it is one, e.g., depending on a binary crossing or awareness indicator. Interestingly, if probability information is stored as in FIG. 2a, the actual values stored are either 0 or 1, which means that either one of two motion models is selected. As a side effect of storing multiple collections, a mixing between different motion models is achieved without having to perform the mixing on the level of individual variables.

One may have multiple motion models depending on a discrete variable. For example, a discrete variable may indicate whether a pedestrian is walking on a sidewalk, crossing or on the road, e.g., three levels, or yet a further alternative, e.g., four levels. For each situation a different advancing function may be used, each of which may depend on a different trained parameter. The advancing function may even be the same expect for a different trained parameter(s). For example, the used motion model may depend on the walk/stop variable.

Yet a further improvement comprises the use of a feature vector. For example, an advancing function may rely on a feature vector. The feature vector may be computed from at least the discrete latent variable. The advancing function may comprise computing a dot-product between the feature vector and a trained parameter vector and applying a sigmoid function to the dot-product. The feature vector may be used to encode a variety of semantic information. For example, such semantic information may include the distance to a crossing, the distance to a car, the orientation towards the car or towards the crossing, and so on. Alternatives to a dot-product include, e.g., a probability table, and a probability table weighted or selected by features.

The orientation may be modelled as a linear Von Mises stochastic model centered around the most recent value of hidden head pose, e.g., attained at time t−1, while for the hidden body pose variable one may adopts a switching Von Mises model, where the variable controlling the switch is the current crossing intention variable. In particular, if such variable takes value 0 the transition model is the same as for head pose, while if the intention variable takes value 1, the transition model is centered around a weighted average of the most recent body pose angle and the direction locally orthogonal to the road edge.

Velocity and position may be modelled as a multivariate Gaussian model, conditioned on the value of the walk/stop node. When such a variable takes value 0, the velocity is assumed to be Gaussian distributed with zero valued mean and the position is assumed to be Gaussian distributed and centered around the most recent hidden position value. Instead when the walk/stop switch takes value 1, the mean of the next state may be computed via Euler integration of Newton's second law of motion under a social force model. For example, two fictitious forces may be exerted onto an agent: a driving force and a social force. The driving force has a longitudinal component proportional to the difference between a desired speed parameter and the most recent hidden velocity magnitude and an orthogonal component proportional to the angular displacement between the current hidden body pose and the velocity vector orientation at time t−1. The social force instead may be implemented as a repulsive field coupling each pair of agents, whose intensity decays exponentially with agents' distance.

Interestingly, the social force framework may consider interactions not only between agents of the same class, e.g., between pedestrians, but also between different classes of agents, e.g., between pedestrians and vehicles.

An observation model may assume that measurements are distributed according to the appropriate model, e.g., Gaussian models or the Von Mises models for circular variables, whose means are located at the same value of the corresponding hidden variables.

Figure 7:
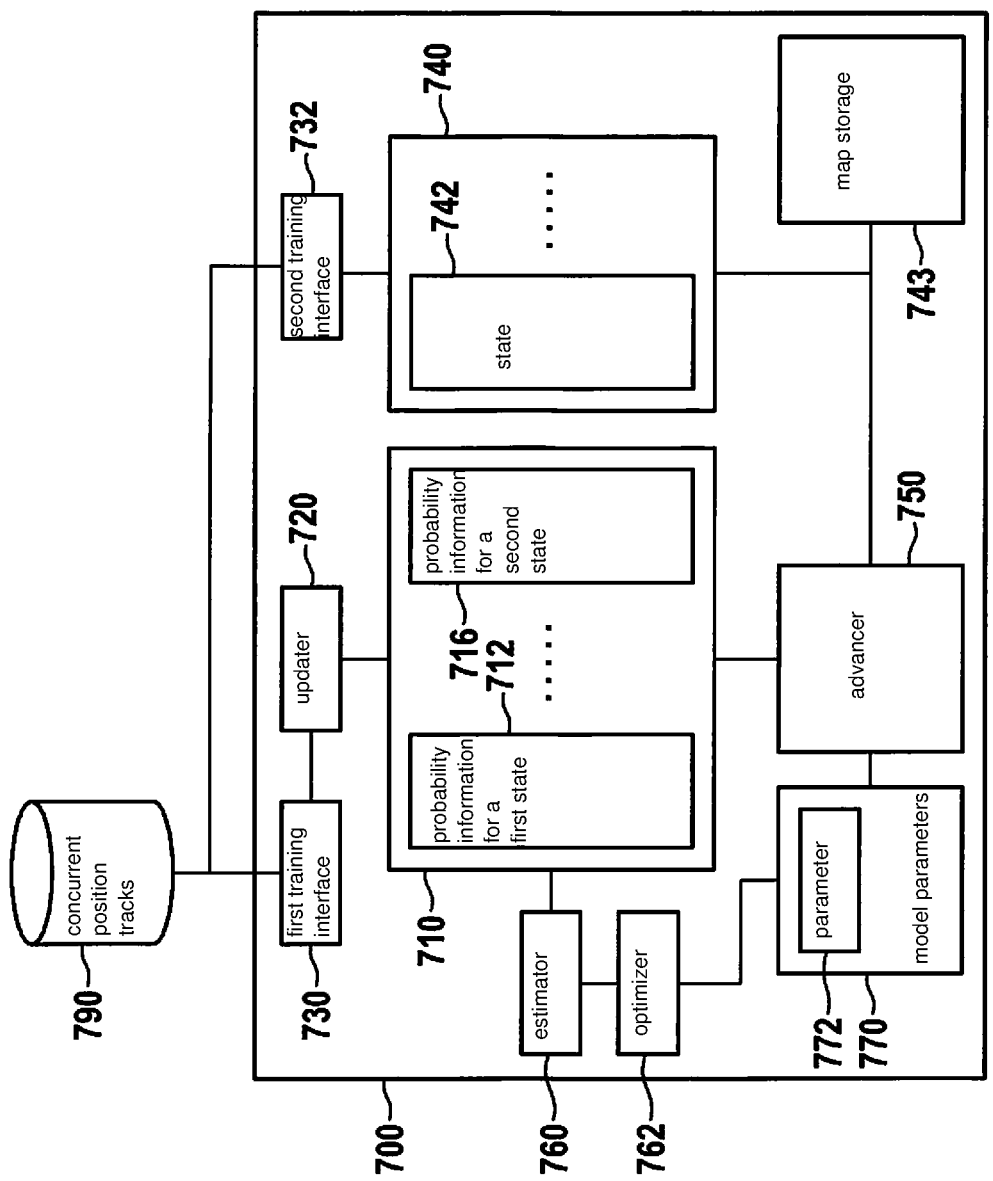
FIG. 7 schematically shows an example of a training device.

FIG. 7 schematically shows an example of a training device 700. Training device 700 may be used to obtain a prediction device 100, e.g., in particular the trained model 700 used in a prediction device 100. The design of training device 700 may be similar to that of prediction device 100, except that some simplifications can be made, and/or additions need to be made. For example, prediction device 700 may comprise a training interface 730 for accessing a set 790 of concurrent position and orientation tracks of one or more pedestrians and/or cars, etc. For example, set 790 may be obtained by recording sensor information in a car, e.g., a car like car 400. A position and orientation track records the position and orientation along multiple time steps. Processing of the sensor signals may already have been done. Training interface 732 may obtain information on agents that do not need probabilistic modelling, e.g., of other cars. This information may also be obtained from set 790.

In part training device 700 may be similar to a prediction device, e.g., as illustrated in FIG. 1a or 1b. For example, training device 700 may comprise a primary memory 710 and a secondary memory 740, and updater 720 and an advancer 750. Advancer 750 may use the same advancing functions as advancer 150. Advancer 750 depends on the parameters in the possibly untrained model 770. Training device 700 comprises an estimator 760 which attempts to estimate a location of a pedestrian using the existing parameters 770 and/or an optimizer 762 which optimizes the parameters to improve said estimations.

For example, optimizing a parameter of the probabilistic interaction model may comprise maximizing an expectation of the joint probability of the sensor measurements, e.g., position and orientation tracks, and the latent variables for all data in the training set. Note that estimator 760 is not necessary as the optimization process may use the entire probability distribution. Optimizing may result in a global or local optimum. If optimizing is interrupted, e.g., due to time constraint, the resulting parameters need not necessarily be in an optimum.

For example, an embodiment may take as input a set of discrete-time agent tracks. It then uses a probabilistic directed graphical model, e.g., a Bayesian network to make inferences about the joint hidden state of all agents given input measurements of their observable state, e.g., position, velocity and orientation. Subsequently, it may train the network by optimizing its parameters so as to maximize the expected joint probability of the hidden states and the measurements. These two steps, namely inference and training, may be repeated in an alternate fashion until a convergence criterion is satisfied.

When such criterion is met, the graphical model can be used to predict agents' future moves, e.g., in car 400.

During the inference phase, the computer may sample from the posterior probability distribution of the joint hidden state of all agents conditioned on the measurements provided by a perception pipeline. A sample drawn from such posterior probability distribution, at a given time-step, may comprise a collection of hidden variable vectors, one per agent. For example, in an embodiment, such a vectors may contain one, or more, or all, of:

a discrete awareness variable
   a discrete intention variable
   a discrete motion model variable
   a continuous 2-d velocity vector
   a continuous 2-d position vector
   a scalar body pose variable
   a scalar head pose variable In the various embodiments of prediction device 100 or training device 700, or car 400, a user interface may be provided. The user interface may include conventional elements such as one or more buttons, a keyboard, display, touch screen, etc. The user interface may be arranged for accommodating user interaction for performing a prediction or training action, or to control the car, e.g., to act upon a prediction by manual controlling the car.

Typically, the prediction device 100 or training device 700, or car 400 each comprise a microprocessor which executes appropriate software stored at the device; for example, that software may have been downloaded and/or stored in a corresponding memory, e.g., a volatile memory such as RAM or a non-volatile memory such as Flash. Alternatively, the devices 100, 400 and 700 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

A processor system may comprise a processor circuit. The processor system may be implemented in a distributed fashion, e.g., as multiple processor circuits. A storage may be distributed over multiple distributed sub-storages. Part or all of the memory may be an electronic memory, magnetic memory, etc. For example, the storage may have volatile and a non-volatile part. Part of the storage may be read-only.

Below, a detailed example embodiment is provided to illustrate the present invention. Various optional enhancements have been included in the embodiment below. Many specific choices were made in this example, but it is stressed however that this embodiment could be varied in many places. For example, the model could include more or fewer variables, the model could use more or fewer or different features, advancing functions and the like.

In this example embodiment, the dynamics of M socially-aware pedestrian agents interacting with each other as well as with N vehicles is modelled. It is assumed in this embodiment that the kinematic state of all agents, as represented by their position, orientation and velocity can be at least partially measured at a constant rate. Given such data, the model may be used to learn the multi-agent system dynamics, and to yield accurate behavioral predictions of unseen data. In what follows a Dynamic Bayesian Network (DBN) is presented, which represents generatively the joint behavior of multiple traffic agents. A graphical representation of the model is depicted in FIG. 5.

Formally the observed data may comprise a set $Y=\{y_i | i \in I\}$ where $I=\{1, \ldots, M\}$ is an index set over agents (in particular pedestrians) and each element $y_i=\{y_{i,t}\}_{t=0}^{T}$ is a multivariate time series. The observed vector $y_{i,t}$ contains position and velocity as well as body and head orientation measurements, denoted by $p_{i,t}$, $v_{i,t}$, $\varphi_{i,t}$ and $\psi_{i,t}$ respectively. In addition, define the concatenation of position and velocity measurements for one agent at a given time-step (observed variables 567) as $x_{i,t}=[p_{i,t}, v_{i,t}]^T$ and the concatenation of head and body orientation for agent i at time t (observed variables 568) as $\omega_{i,t}=[\varphi_{i,t}, \psi_{i,t}]^T$.

The proposed model 500 contains three hierarchical hidden levels, shown in FIG. 5, such that edges connecting nodes corresponding to the same time step only exist between adjacent levels and in a top-down direction. FIG. 5 shows levels 510, 520 and 530. FIG. 5 shows two consecutive time-steps: a time-step 551 at time t−1, and a time-step 550 at time t. Each level may comprise multiple layers.

Model 500 may comprise an attention part 542 for modelling attention of pedestrians, e.g., an awareness of a car, of another pedestrian, etc., an intention part 544 for modelling intentions of pedestrians, e.g., an intention to cross a road, an intention to move towards some goal, etc. and a motion part 546 for modelling motion of pedestrians. Attention part 542 may comprise one or more attention variables 562. Intention part 544 may comprise one or more intention variables 563. Motion part 546 may comprise one or more stop/walk variables 564, body and/or head orientation variables 565 and one or more motion variables 566.

The highest hierarchical level, level 510, includes discrete hidden states capturing contextual awareness as well as road crossing intention. In particular, such hidden variables are denoted by $w_{i,t} \in \{0,1\}$ and $c_{i,t} \in \{0,1\}$ respectively. The second level 520 contains binary latent variables $s_{i,t} \in \{0,1\}$, which serve to switch between standing and walking modes, together with continuous hidden variables $g_{i,t}=[\rho_{i,t}, q_{i,t}]^T$, representing hidden body ($\rho_{i,t}$) and head ($q_{i,t}$) orientation. Finally, the third hierarchical level 530 includes hidden positions and velocities, which are denoted by $z_{i,t}=[r_{i,t}, u_{i,t}]^T$. In what follows, the joint hidden state of agent i at time t will be referred to, which encompasses all latent layers, as $h_{i,t}$. Additional observed variables 561, denoted by $\{\chi_n\}_{n=1}^N$, are introduced, which represent time series of the measured dynamical state of N vehicles present in the scene. Modeling drivers' behavior may be added in the model, or vehicle measurements may be treated as deterministic input sequences to the network. The described embodiment below uses the latter option.

Temporal correlations in the data are encoded via first order Markovian dependencies between hidden states at different time steps. In addition, the state transition model is homogeneous in the sense that the parameters of the corresponding conditional distributions are shared across time steps and agents.

The contextual awareness layer 562 lies in the first hierarchical level and it encodes a binary attention mechanism that is intended to capture whether an agent is being attentive or not to oncoming traffic. Its state transition may be defined as a logistic sigmoid model $$p(w_{i,t}=1 | w_{i,t-1}, z_{i,t-1}, q_{i,t-1}, U_{n=1}^N \chi_{n,t-1}) = \sigma(\theta_w^T f_w), \quad (1)$$

with the following feature vector values $$f_w = \begin{bmatrix} f_w^{(1)} = 1_{w_{i,t-1}=0} \\ f_w^{(2)} = 1_{w_{i,t-1}=1} \\ f_w^{(3)} = \sum_{n=1}^{N} \frac{\Delta r_{ni,t-1}^{(1)} \cos q_{i,t-1} + \Delta r_{ni,t-1}^{(2)} \sin q_{i,t-1}}{\|\Delta r_{ni,t-1}\|^2 \sum_{n=1}^{N} \|\Delta r_{ni,t-1}\|^{-1}} \end{bmatrix}. \quad (2)$$

In equation (2) the relative position vector $r_{n,t-1} - r_{i,t-1}$ between vehicle n and pedestrian i are denoted by $\Delta r_{ni,t-1}$. In addition, introduced the notation $a=[a^{(1)}, \ldots, a^{(D)}]^T$ to indicate the components of a generic D-dimensional vector a. The first two features act as categorical autoregressive predictors in the logistic model, in order to enforce correlations between hidden variables at different time steps. The third feature, instead, evaluates average cosine values of the angles between pedestrian's head orientation and the set of vectors $\{\Delta r_{ni,t-1}\}_{n=1}^N$, with a weighting inversely proportional to the distance. In other words, the model may assume that pedestrians are more likely aware when their head orientation is aligned with the relative position vector of oncoming vehicles.

The binary intention variable $c_{i,t}$ in layer 563 should encode whether agent i at time t is planning to cross the road in the proximity of his current location. Its state transition model may be defined as follows $$p(c_{i,t} \mid c_{i,t-1}) \propto \prod_{l \in \mathcal{C}} \prod_{k \in \mathcal{C}} \pi_{lk}^{1_{c_{i,t}=l} \cdot 1_{c_{i,t-1}=k}} \left(1 + f_c \cdot 1_{c_{i,t}=1}\right), \quad (3)$$

where $\pi_{lk}$ are the elements of a Markov transition matrix $\Pi \in \mathbb{R}^{2 \times 2}$ and $\mathcal{C} = \{0,1\}$. Such a model incorporates a priori knowledge derived from traffic rules via the re-weighting term $1 + f_c \cdot 1_{c_{i,t}=1}$. In particular this term makes use of semantic information, as encoded in the static environment, to place a stronger prior on $c_{i,t}$ being equal to 1 when an agent is close enough to a zebra crossing. In fact, one may define $f_c$ as $$f_c = \begin{cases} \varepsilon, & \text{if } D_{i,t-1}^{(zebra)} \leq \delta \\ 0, & \text{otherwise} \end{cases} \quad (4)$$

with $D_{i,t-1}^{(zebra)}$ indicating the minimum distance of agent i to a zebra crossing at time t-1.

The dynamics of the binary variables $s_{i,t} \in \{0,1\}$ in layer 564 capture pedestrians' ability to estimate collision criticality when interacting with vehicles as well as their inclination to stop when such a criticality exceeds their own collision risk tolerance. The model may be as follows $$p(s_{i,t}=1 \mid s_{i,t-1}, z_{i,t-1}, w_{i,t}, U_{n=1}^N \chi_{n,t-1}) = \sigma(\theta_s^T f_s), \quad (5)$$

where the feature vector may be defined by $$f_s = \begin{bmatrix} f_s^{(1)} = 1_{s_{i,t-1}=0} \\ f_s^{(2)} = 1_{s_{i,t-1}=1} \\ f_s^{(3)} = \max\left(\{f_{s,n}^{(3)}\}_{n=1}^N\right) \end{bmatrix} \quad (6)$$

with $$f_{s,v}^{(3)} = \begin{cases} \frac{1+w_{i,t}}{D_{ni,t-1}\tau_{ni,t-1}}, & \text{if } \cos\delta_{ni,t-1} \leq 0 \\ 0, & \text{otherwise} \end{cases} \quad (7)$$

and $$D_{ni,t-1} = \|\Delta r_{ni,t-1}\| |\sin\delta_{ni,t-1}|, \quad (8)$$

$$\tau_{ni,t-1} = -\frac{\|\Delta r_{ni,t-1}\|}{\|\Delta u_{ni,t-1}\|}\cos\delta_{ni,t-1}. \quad (9)$$

The right-hand side of (8) equals the minimum distance between pedestrian i and vehicle n under a constant velocity model for both of the agents. Such a distance would be attained in the future, at time $t-1+\tau_{ni,t-1}$, only if the cosine of the angle $\delta_{ni,t-1}$ between $\Delta r_{ni,t-1}$ and $\Delta u_{ni,t-1}$ is negative, thus motivating the definition in (7).

Moving on to the second layer 565 of the second hierarchical level, there the hidden dynamics of body orientation may be represented via a switching non-linear dynamical system, e.g., the following]

$$p(\rho_{i,t} \mid \rho_{i,t-1}, z_{i,t-1}, c_{i,t}=0) = V(\rho_{i,t}; \rho_{i,t-1}, \gamma_0), \quad (10)$$

$$p(\rho_{i,t} \mid \rho_{i,t-1}, z_{i,t-1}, c_{i,t}=1) = V(\rho_{i,t}; v_{i,t}, \gamma_1), \quad (11)$$

with V denoting Von Mises distributions and $$v_{i,t} = \text{atan2}\left(\theta_\rho^{(1)}\cos(\rho_{i,t-1}) + \theta_\rho^{(2)}\frac{\Delta r_{Ci}^{(2)}}{\|\Delta r_{Ci}\|}, \theta_\rho^{(1)}\sin(\rho_{i,t-1}) + \theta_\rho^{(2)}\frac{\Delta r_{Ci}^{(2)}}{\|\Delta r_{Ci}\|}\right), \quad (12)$$

where $$\Delta r_{Ci} = \min_r \|r_{i,t-1} - r\|^2. \quad (13)$$

$$\text{s.t.} \quad r \in \{r_s : l_s = \text{'road'}\},$$

In equation (13) $s \in S$ is a pixel index relative to a semantic map of the static environment and $l_s$ denotes the corresponding semantic label. Equation (12) states that, if agent i intends to cross the road, its hidden body orientation must be Von Mises distributed around a weighted circular mean of it previous orientation and the angle corresponding to the orientation of the relative position vector $\Delta r_{Ci}$.

Finally, for capturing hidden head orientation dynamics, the following stochastic linear model is used $p(q_{i,t} \mid q_{i,t-1}) = V(q_{i,t}; q_{i,t-1}, \gamma_2)$.

The actual motion model of each agent, which corresponds to the third hierarchical level and layer 566 of the network, may be conditioned on the value of the stop/walk switch variable $s_{i,t}$. In particular, when $s_{i,t}=0$ $$p(z_{i,t} \mid z_{i,t-1}, s_{i,t}=0) = \mathcal{N}(z_{i,t}; [r_{i,t-1}, 0, 0]^T \Gamma_1). \quad (14)$$

Instead, if $s_{i,t}=1$, one may adopt a non-linear Gaussian social force motion model $$p(z_{i,t} \mid \rho_{i,t}, U_{j=1}^M z_{j,t-1}, s_{i,t}=1) = N(z_{i,t}; \eta, \Gamma_2), \quad (15)$$

where $\eta$ is a vector function defined as $$\eta = \begin{bmatrix} r_{i,t-1} + u_{i,t-1}\Delta t + \frac{1}{2}F_{i,t}\Delta t^2 \\ u_{i,t-1} + F_{i,t}\Delta t \end{bmatrix}, \quad (16)$$

which may use Euler-Maruyama integration of Newton's second law of motion under the social force model for a single unit of mass. The total force term $F_{i,t}$ acting on agent i at time t is obtained as the sum of individual force terms, which are defined in the following.

The driving force for each agent is defined as $$F_{i,t}(drv) = \alpha^{(0)}\left(u_i^{(d)} - \|u_{i,t-1}\|\right)\hat{u}_{i,t-1} + \alpha^{(1)}\frac{(u_{i,t-1}^{(1)}\sin\rho_{i,t} - u_{i,t-1}^{(2)}\cos\rho_{i,t})}{\|u_{i,t-1}\|}\hat{n}_{u_{i,t-1}}, \quad (17)$$

where $\hat{u}_{i,t-1}$ is a unit vector parallel to $u_{i,t-1}$ and $\hat{n}_{u_{i,t-1}}$ is a unit vector orthogonal to $u_{i,t-1}$.

The first term in (17) is a tangential component, with magnitude proportional to the difference between the desired (e.g. comfortable) navigation speed $u_i^{(d)}$ of agent i and the magnitude of their hidden velocity at time t-1. The second term instead is a radial force component, proportional to the sine of the angular difference between hidden body orientation and the direction of motion at time t-1. In other words, the model makes use of hidden body orientation variables, which are conditioned on the latent intention $c_{i,t}$, to explain changes in motion direction. Note that the model does not require an assumption of the final destination of each agent to be known in order to build driving energy terms.

Repulsive forces induced by other pedestrian agents may be represented by means of the following interaction terms $$F_{ij,t}(\text{int}) = \beta \exp\left(\theta_z^{(int)^T} f_z(r_{j,t-1}, r_{i,t-1}, u_{j,t-1}, u_{i,t-1})\right)\hat{f}_{ij,t-1}. \quad (18)$$

with

-continued $$f_z = \begin{bmatrix} f_z^{(1)} = -\|\Delta r_{ij,t-1}\|^2 \\ f_z^{(2)} = \log\left(1 - \frac{\Delta r_{ij,t-1}^T \Delta u_{ij,t-1}}{\|\Delta r_{ij,t-1}\|\|\Delta u_{ij,t-1}\|}\right) \end{bmatrix},$$ (19)

and where the following notation is used $$\Delta r_{ij,t-1} = r_{i,t-1} - r_{j,t-1},$$ (20)

$$\Delta u_{ij,t-1} = u_{i,t-1} - u_{j,t-1},$$ (21)

$$f_{ij,t-1} = \text{sign}(\Delta r_{ij,t-1}^T \hat{n}_{u_{j,t-1}}) \hat{n}_{u_{i,t-1}}.$$ (22)

The interaction magnitude may be assumed to decrease exponentially with the square of the distance between agents and an anisotropic term $f_z^{(2)}$ is introduced to discount social forces between agents that are moving further apart. However, as opposed to previous work, one may assume that that interaction forces act orthogonally to agent speed rather than along the direction of relative displacement between interacting agents. In fact, the latter approach, which also yields a tangential interaction force component, was empirically found to induce unstable motion dynamics. A geometric interpretation of the proposed social force computation is illustrated in FIG. 6c.

Exploiting the proposed generative model to make predictions about agents' future behavior at time t', conditioned on observations up to time T, may comprise evaluating the following integral $$p(h_{t'}|\{y_i\}_{i=1}^M, \Theta) = \int p(h_T|\{y_i\}_{i=1}^M) p(h_{t'}|h_T) dh_T,$$ (23)

with t'>T, $h_{t'}$ denoting $U_{i=1}^M h_{i,t'}$, $dh_T = \Pi_{j=1}^M dh_{j,T}$, and $\Theta$ being the entire set of model parameters, which is omitted for brevity in the right-hand side of the equation. The state transition probability between time-steps T and t' can be evaluated by marginalizing out hidden states at all the intermediate time-steps from the joint probability of the future state sequence.

The probability $p(h_T|\{y_i\}_{i=1}^M)$ is a posterior distribution over the hidden states at time T given measurements in the time interval [0,T]. As such, evaluating this quantity may be regarded as a canonical Bayesian inference problem, and may be addressed via sequential Monte Carlo sampling (SMC) [7]. An alternative for sequential Monte Carlo sampling may be variational approximations.

To infer the joint hidden state of all agents one may adopt a bootstrap filtering approach, that is one may use the state transition prior of the model as a proposal distribution, with an adaptive number of particles depending on the number of agents and a systematic resampling step to reduce the estimates' variance.

For parameter learning Maximum Likelihood Estimation (MLE) may be used, e.g., via the Expectation-Maximization (EM) algorithm. For example, one may use a stochastic variant of the EM algorithm and in particular adopt the MCEM formulation. The latter was found to be the most stable approach compared to other variants.

The parameters in the set $\Theta^{(a)} = \{\beta, \alpha, \Gamma_1, \Gamma_2, \Pi\}$ can be updated in closed form during each M-step, conditioned on the current estimates of all the other parameters. In particular, the estimator for $\beta$ is $$\hat{\beta} = \frac{\sum_{p=1}^{L}\sum_{i=1}^{M}\sum_{t=0}^{T} W_{p,t} \hat{\Delta} z_{p,i,t}^T \Gamma_2 \hat{\delta} z_{p,i,t} 1(s_{p,i,t}=1)}{\sum_{p=1}^{L}\sum_{t=0}^{T} W_{p,t} \hat{\delta} z_{p,i,t}^T \Gamma_2 \hat{\delta} z_{p,i,t} 1(s_{p,i,t}=1)},$$ (24)

where $W_{p,t}$ is the weight of posterior sample p at time t and one may define $$\hat{\Delta} z_{p,i,t} = \begin{bmatrix} \Delta r_{p,i,t} - u_{p,i,t-1} \Delta t - \frac{1}{2}(F_{p,i,t} - F_{p,i,t}^{(int)}) \Delta t^2 \\ \Delta u_{p,i,t} - \frac{1}{2}(F_{p,i,t} - F_{p,i,t}^{(int)}) \Delta t \end{bmatrix},$$ (25)

with $$\hat{\delta} z_{p,i,t} = \left[\frac{1}{2} F_{p,i,t}^{(int)} \Delta t^2, F_{p,i,t}^{(int)} \Delta t\right]^T.$$

Equivalent update rules can be derived for the driving force weights $\alpha^{(0)}$ and $\alpha^{(1)}$. The covariances $\Gamma_1$ and $\Gamma_2$ can instead be estimated via $$\hat{\Gamma}_1 = \frac{\sum_{p,i,t} W_{p,t}(z_{p,i,t} - \eta_0)(z_{p,i,t} - \eta_0)^T 1(s_{p,i,t=0})}{\sum_{p=1}^{L}\sum_{i=1}^{M}\sum_{t=0}^{T} W_{p,t} 1(s_{p,i,t=0})},$$ (26)

where $\eta_0 = [r_{p,i,t-1}, 0]^T$, and $$\hat{\Gamma}_2 = \frac{\sum_{p,i,t} W_{p,t}(z_{p,i,t} - \eta)(z_{p,i,t} - \eta)^T 1(s_{p,i,t=1})}{\sum_{p=1}^{L}\sum_{i=1}^{M}\sum_{t=0}^{T} W_{p,t} 1(s_{p,i,t=1})},$$ (27)

with $\eta$ given by (16). Finally, the elements of the state transition matrix $\Pi$ are updated by $$\hat{\pi}_{lk} = \frac{S_{l,k}}{S_l} = \frac{\sum_{p=1}^{L}\sum_{i=1}^{M}\sum_{t=0}^{T} W_{p,t} 1(c_{p,i,t=l} \wedge c_{p,i,t-1=k})}{\sum_{p=1}^{L}\sum_{i=1}^{M}\sum_{t=0}^{T} W_{p,t} 1(s_{p,i,t-1=k})},$$ (28)

with $\mathcal{S} = \{\mathcal{S}_l, \mathcal{S}_{l,k}\}_{l,k \in \{0,1\}}$ denoting the sufficient statistics of the crossing intention state transition.

For all the remaining parameters $\Theta^{(o)} = \Theta \setminus \Theta^{(a)}$, the complete data log-likelihood may be maximized using a non-linear conjugate gradient algorithm, e.g., as by implementing the M-step via gradient-based optimization.

Pseudocode of an embodiment of the learning procedure is shown below:

Model Learning
    Input: set of multi-agent tracks $\mathcal{Y} = \{Y_n\}_{n=1}^{N_{tracks}}$
    Parameters: number of particles per track $\{N_n\}_{n=1}^{N_{tracks}}$, initial parameters $\Theta_{init}$, maximum number of iterations $N_{iter}$, objective relative variation tolerance $\in$.

---

Procedure MCEM
    $\Theta_0 \leftarrow \Theta_{init}$ initialize parameters
    $Q_0 \leftarrow -\infty$ initialize expected log-likelihood
    For $\iota \leftarrow 1$ to $N_{iter}$ do
        $Q_\iota \leftarrow 0$ initialize new Q function
        $\mathcal{S}_\iota \leftarrow 0$ initialize sufficient statistics -continued

```
for Y_n ∈ 𝒴 do
    H_{t,n} ← InferenceSubroutine(Y_n, N_n)
    𝒮_t ← SufficientStatistics(Y_n, H_{t,n})
End for
Θ_t^(a) ← ClosedFormM – step(𝒮_t, Θ_{t-1})
Θ_t^(o) ← ConjugateGradM – step(𝒴, H_t, Θ_{t-1})
for Y_n ∈ 𝒴 do
    Q_t ← Q_t + ExpectedLogl(Y_n, H_{t,n}, Θ_t)
End for
if |(Q_t – Q_{t-1})/Q_t| ≤ ∈ then
    return Θ_t, H_t
end if
end for
return Θ_t, H_t
end procedure
```

Empirical evaluations of the example method were performed on data-sets of two different kinds. The first one (data-set 1) is a new data-set, which captures real urban traffic scenes, with interactions occurring among pedestrians as well as between pedestrian agents and driving vehicles, while the second one (data-set 2) is a benchmark data-set containing pedestrian tracks in crowded, vehicle-free zones.

Data-set 1 was acquired from a vehicle equipped with multiple sensors while driving, for approximately five hours, in an urban area in southern Germany. The sensor set included one mono-RGB camera, one stereo-RGB camera, an inertial measurement system with differential GPS and a lidar system (see FIG. 6a).

Pedestrian tracks were obtained by fusion of camera detections and projected lidar segments. Object detection was performed with the method of He et al.[14] using a ResNet-101 backbone architecture. Additionally, in order to allow agent re-identification after occlusion, for each pedestrian a feature vector was generated using the method proposed in [30]. After performing lidar-camera calibration and segmentation of the 3D point cloud data, lidar segments were projected to camera images and matched them to the detections. For the purpose of tracking, pedestrians were represented using their re-identification feature vectors and the center of mass of their segments. In addition, head and body orientation features were obtained for all pedestrian agents by manual annotation of the camera images. The resulting data-set comprises forty-four annotated tracks, twenty-two of which contains pedestrian crossing scenes. Finally, a semantic map of the environment was also generated manually, by assigning each pixel, of size 0.1×0.1 m², one of the following labels: road, zebra crossing, sidewalk, bus lane, free car access zone. The results indicate that a sudden change in motion direction, from approximately parallel to approximately orthogonal to road edge, is successfully encoded by the model in the latent crossing intention variable.

Figure 6A:
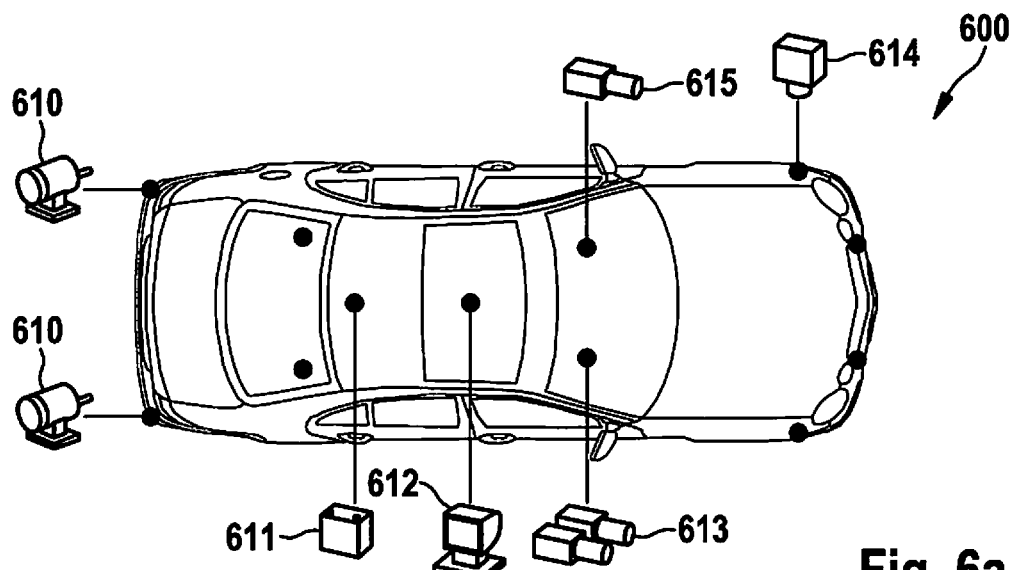
FIG. 6a schematically shows an example of an embodiment of a car.
Figure 6B:
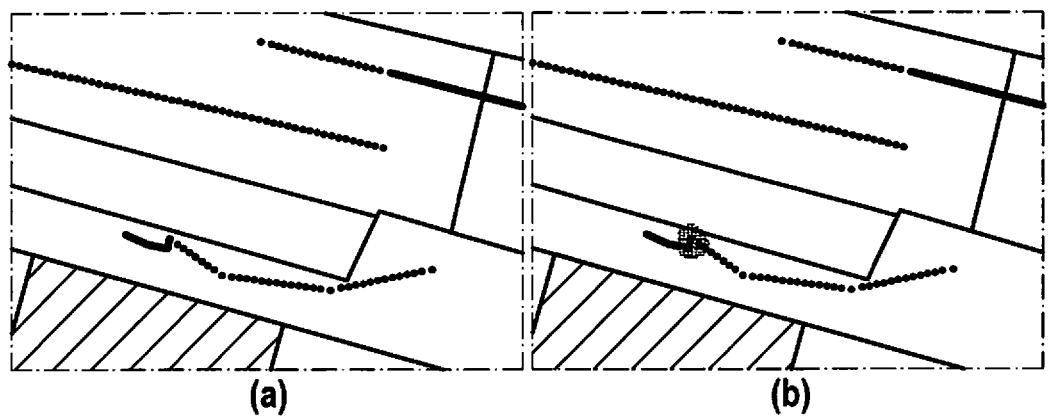
FIG. 6b(a) schematically shows an example of a map and inference and prediction results.
Figure 6B:
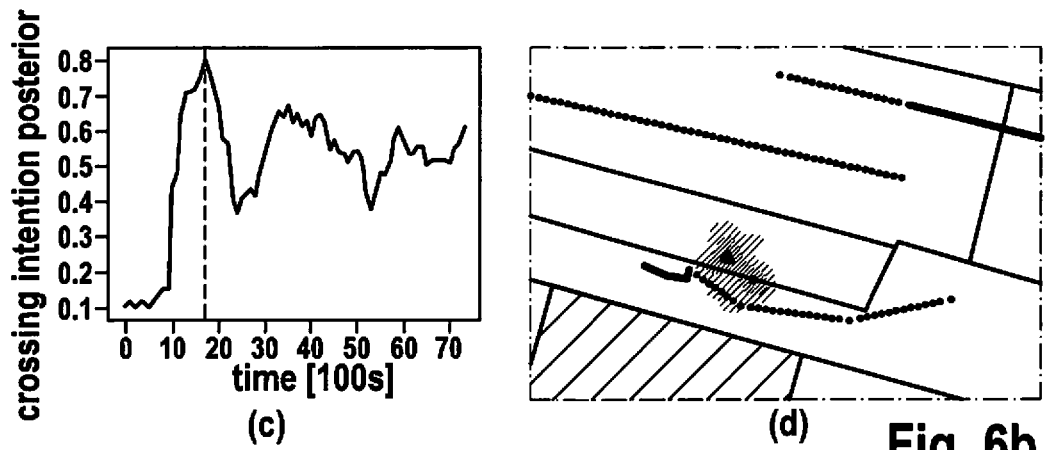
Figure 6C:
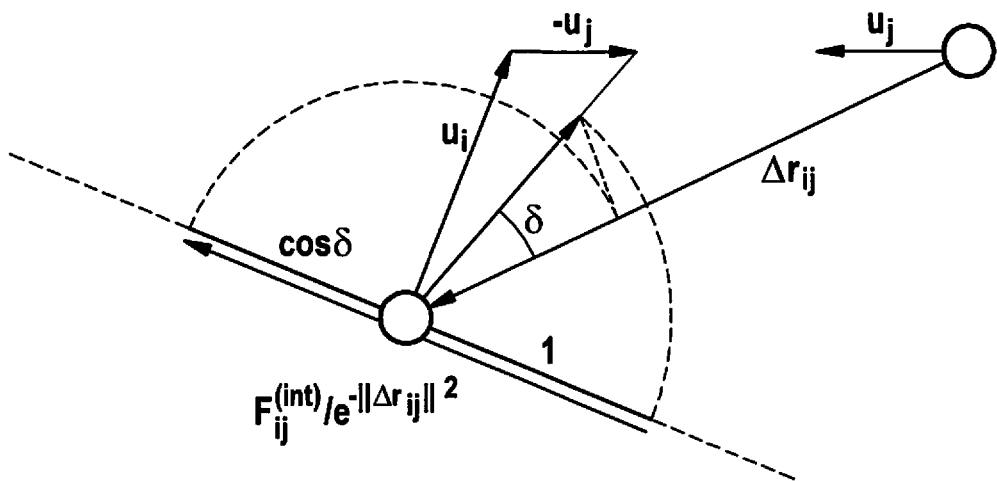
FIG. 6c schematically shows a social force computation.

FIG. 6b shows inference and prediction results for one of the tracks in the used data-set. FIG. 6b(a) illustrates the past (solid line) and future (dotted line) trajectory of a pedestrian agent walking on the sidewalk while two cars are driving by. FIG. 6b(b) illustrates the inferred position at the last observed time-step $t_o$. FIG. 6b(c) illustrates the posterior probability of crossing intention along the entire track, respectively, with the vertical line in FIG. 6b(c) marking time $t_o$. FIG. 6b(d) shows the predicted position at time $t_o+2$ sec.

The second data-set is the ETH human trajectory data-set, which has established itself as a benchmark for multi-agent pedestrian prediction. Such data are split in two sets (ETH-campus and HOTEL) recorded at different locations with a static camera from a bird-eye view. Each of the two sets includes manually annotated pedestrian tracks, which were used to train and cross-validate (using a two-fold scheme) the model. At test time individual trajectories were observed for 3.2 seconds and their paths were predicted for the next 4.8 seconds. As metrics the average mean square error between predicted and ground truth paths (Average MSE) was used. The table compares the scores obtained in the analysis of Alahi et al. [1] by their social LSTMs and by the deterministic social force model of Yamaguchi et al. [31] with the results produced by a model according to an embodiment (bSF) when using the mean of the predictive distributions to compute accuracy scores.

TABLE 1

Predictive accuracy of the proposed method (bSF) in comparison to the deterministic social force model of Yamaguchi et al. [31] and to the social LSTM model [1] (sLSTM).

| | Average MSE | | |
|---|---|---|---|
| | bSF | SF | sLSTM |
| eth | 0.29 | 0.41 | 0.49 |
| hotel | 0.24 | 0.25 | 0.09 |

In terms of average mean square error, the proposed approach outperforms both the deterministic social force model (SF) [31] and social LSTM model (sLSTM) [1] on the ETH-campus sequence, while on the HOTEL scene best predictive accuracy is obtained by social LSTMs, followed by a prediction method according to an embodiment, which performs only slightly better than the non-probabilistic social force approach. When comparing bSF and SF methods, it should be noted that the state-of-the-art approach proposed in [31] makes use of ground truth future paths of other agents when predicting trajectories. The method according to an embodiment, instead, makes joint predictions of agents' behavior without conditioning on the true future states of other agents, which is a more challenging but also a much more realistic problem setting. Indeed, in spite of not having access to future ground truth, the method yields better average MSE scores compared to the approach of Yamaguchi et al. [31], thus confirming the hypothesis that the probabilistic formulation is inherently robust against measurement noise compared to deterministic approaches, which do not take into account the uncertainty associated with agent detection and tracking.

Figure 6D:
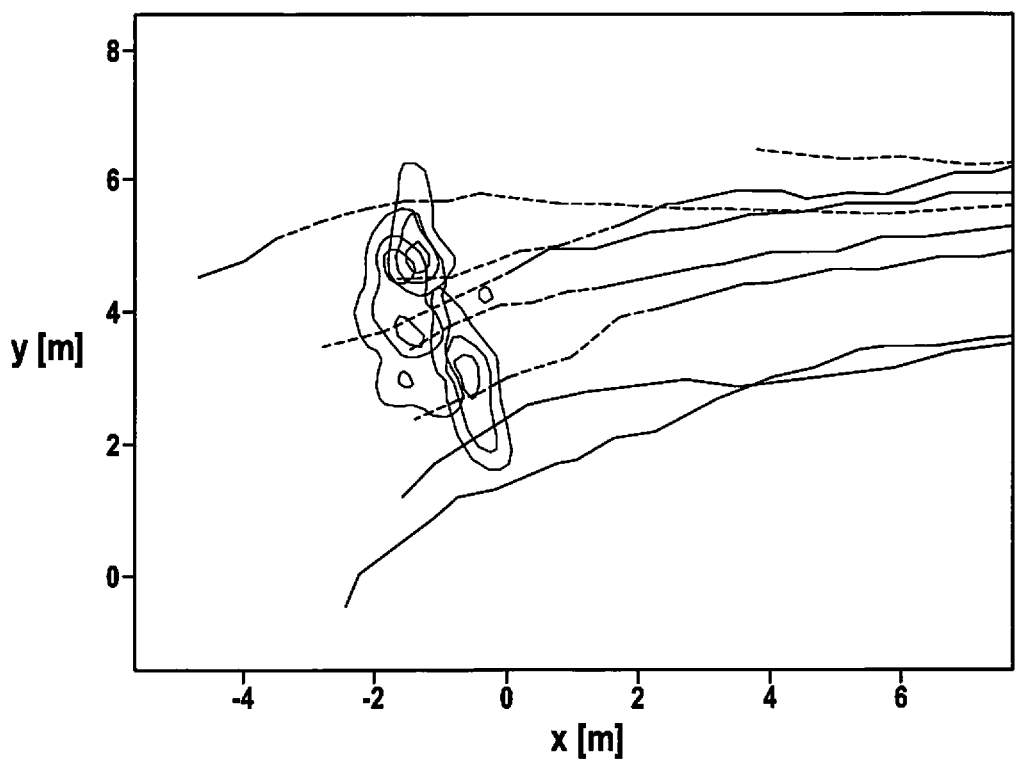
FIG. 6d schematically show behavioral predictions.

FIG. 6d shows behavioral predictions generated by the proposed bSF method for three trajectories from the ETH-campus sequence. Dotted lines indicate future ground truth while past trajectories are plotted as solid lines. This example illustrates how in very crowded environments the model can generate multimodal predictions corresponding to different behavioral hypotheses about which agent is going to pass whom and on what side.

Reference is made to the following documents:
[1] Alexandre Alahi, Kratarth Goel, Vignesh Ramanathan, Alexandre Robicquet, Li Fei-Fei, and Silvio Savarese. Social LSTM: Human trajectory prediction in crowded spaces. In *IEEE Conference on Computer Vision and Pattern Recognition (CVPR* 2016), pages 961-971, 2016.
[7] Arnaud Doucet, Simon Godsill, and Christophe Andrieu. On sequential Monte Carlo sampling methods for bayesian filtering. *Statistics and computing,* 10(3):197-208, 2000.

[14] Kaiming He, Georgia Gkioxari, Piotr Dollár, and Ross Girshick. Mask r-cnn. In *IEEE International Conference on Computer Vision (ICCV* 2017), pages 2980-2988. IEEE, 2017.
[18] Matthias Luber, Johannes A Stork, Gian Diego Tipaldi, and Kai O Arras. People tracking with human motion predictions from social forces. In *IEEE International Conference on Robotics and Automation (ICRA* 2010), pages 464-469. IEEE, 2010.
[24] Stefano Pellegrini, Andreas Ess, Konrad Schindler, and Luc Van Gool. You'll never walk alone: Modeling social behavior for multi-target tracking. In *IEEE International Conference on Computer Vision (ICCV* 2009), pages 261-268. IEEE, 2009.
[30] Nicolai Wojke and Alex Bewley. Deep cosine metric learning for person re-identification. *In IEEE Winter Conference on Applications of Computer Vision (WACV* 2018), pages 748-756. IEEE, 2018.
[31] Kota Yamaguchi, Alexander C Berg, Luis E Ortiz, and Tamara L Berg. Who are you with and where are you going? In *IEEE Conference on Computer Vision and Pattern Recognition (CVPR* 2011), pages 1345-1352. IEEE, 2011.

Figure 8A:
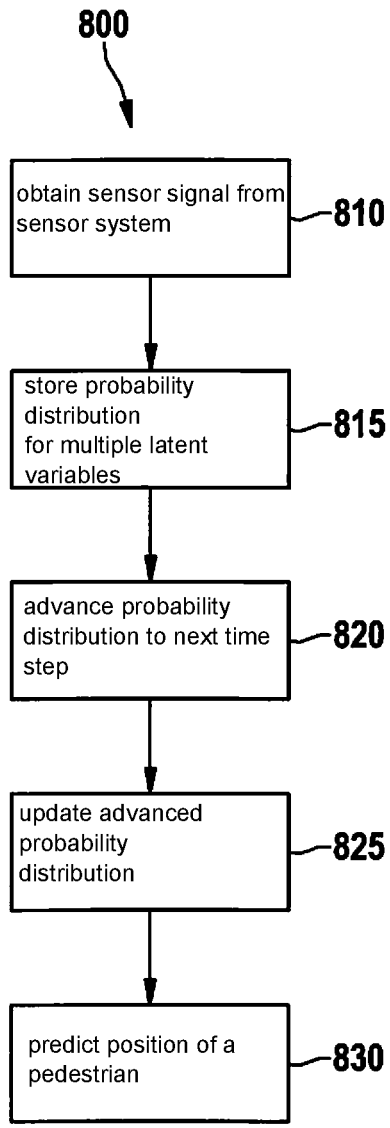
FIG. 8a schematically shows an example of a predicting method.

FIG. 8*a* schematically shows an example of a predicting method 800.

Prediction method 800 may be implemented on a computed and is configured for predicting a location of a pedestrian moving in an environment. Prediction method 800 comprises obtaining (810) a sensor signal (191) from a sensor system (190), the sensor signal comprising at least position and orientation information of one or more pedestrians (A;B) in the environment, storing (815) a probability distribution for multiple latent variables indicating one or more states of the one or more pedestrians, the prediction method modelling a pedestrian as a state comprising multiple latent variables, advancing (820) the probability distribution of the multiple latent variables to a next time step, the advancing comprising applying a trained probabilistic interaction model (170) which models conditional independencies among the latent variables, and updating (825) the advanced probability distribution in dependence on at least the position and orientation information of the one or more pedestrians obtained from the sensor signal, and configured to predicting (830) a position of a pedestrian for which no position information is currently available from the sensor system from the probability distribution of the multiple latent variables.

Figure 8B:
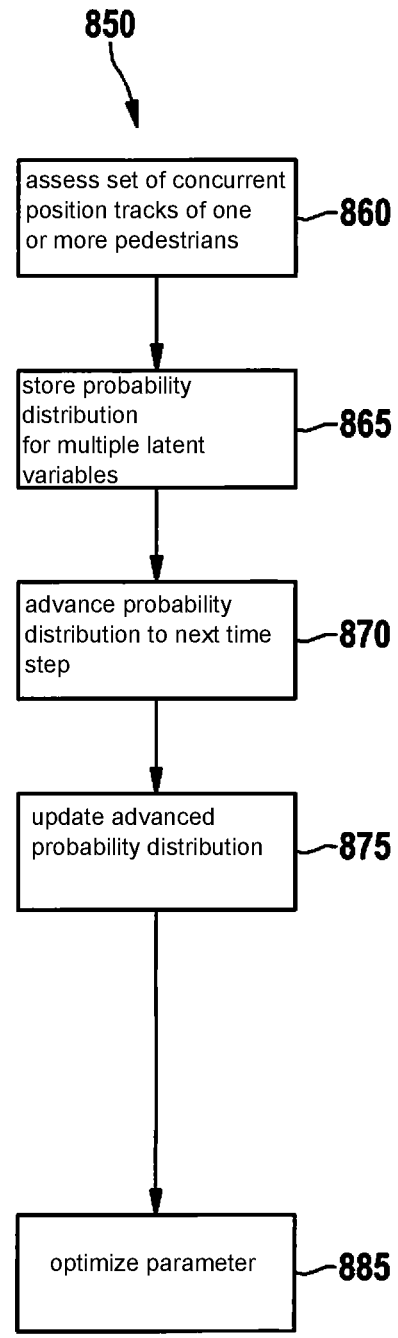
FIG. 8b schematically shows an example of a training method.

FIG. 8*b* schematically shows an example of a training method 850. Training method 850 may be implemented on a computer and is configured to train a probabilistic interaction model for use in a prediction device or method for predicting a location of a pedestrian moving in an environment. Training method 850 comprises accessing (860) a set (790) of concurrent position tracks of one or more pedestrians in an environment, store (865) a probability distribution for multiple latent variables indicating one or more states of the one or more pedestrians, a pedestrian being modelled as a state comprising multiple latent variables, advancing (870) the probability distribution of the multiple latent variables to a next time step, the advancing comprising applying a probabilistic interaction model which models conditional independencies among the latent variables, updating (875) the advanced probability distribution in dependence upon at least position and orientation information of the one or more pedestrians, and to optimizing (885) a parameter of the probabilistic interaction model to increase the joint probability of a concurrent position tracks and the latent variables.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, some of the steps may be executed, at least partially, in parallel. Moreover, a given step may not have finished completely before a next step is started.

Embodiments of the method may be executed using software, which comprises instructions for causing a processor system to perform method 800 or 850. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the present invention also extends to computer programs, particularly computer programs on or in a carrier, adapted for putting the present invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 9A:
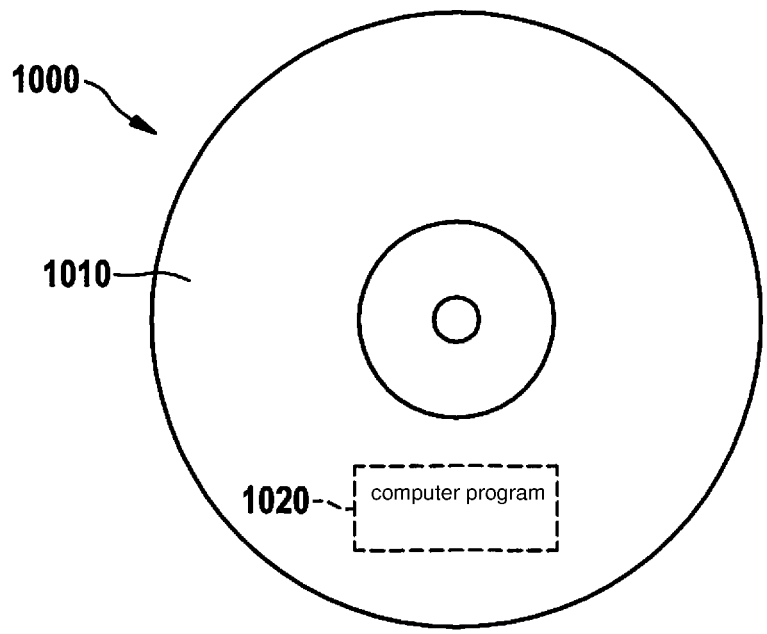
FIG. 9a schematically shows a computer readable medium having a writable part comprising a computer program according to an embodiment.

FIG. 9*a* shows a computer readable medium 1000 having a writable part 1010 comprising a computer program 1020, the computer program 1020 comprising instructions for causing a processor system to perform a prediction method and/or a training method, according to an embodiment. The computer program 1020 may be embodied on the computer readable medium 1000 as physical marks or by means of magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a prediction or training method according to an embodiment.

Figure 9B:
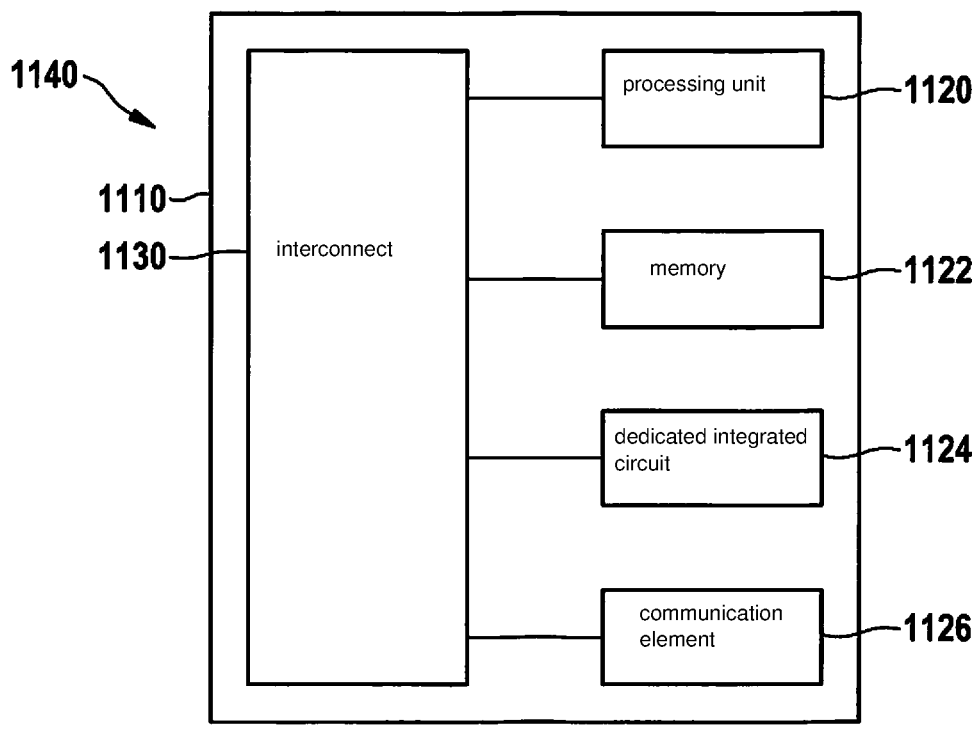
FIG. 9b schematically shows a representation of a processor system according to an embodiment.

FIG. 9b shows in a schematic representation of a processor system 1140 according to an embodiment of a training device and/or a prediction device. The processor system comprises one or more integrated circuits 1110. The architecture of the one or more integrated circuits 1110 is schematically shown in FIG. 9b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively. For example, communication element 1126 may be arranged to receive sensor signals from multiple sensors, either directly or indirectly, or to receive other data, e.g., training data, trained parameters and the like.

For example, in an example embodiment, processor system 1140, e.g., the classifying and/or training device may comprise a processor circuit and a memory circuit, the processor being arranged to execute software stored in the memory circuit. For example, the processor circuit may comprise one or more Intel Core i7 processors, ARM Cortex-R8, etc. The processor circuit may comprise a GPU. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the present invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A prediction device for predicting a location of a pedestrian moving in an environment, the prediction device comprising:
    a signal interface configured to obtain a sensor signal from a sensor system, the sensor signal including at least position and orientation information of one or more pedestrians in the environment;
    a memory configured to store a probability distribution for multiple latent variables indicating one or more states of the one or more pedestrians, the prediction device modelling each pedestrian as a state including multiple latent variables; and
    a processor system configured to iteratively: (i) advance the probability distribution of the multiple latent variables to a next time step, the advancing including applying a trained probabilistic interaction model which models conditional independencies among the latent variables, and (ii) update the advanced probability distribution in dependence on at least the position and orientation information of the one or more pedestrians obtained from the sensor signal, and configured to predict a position of a previously sensed pedestrian for which no position information is currently available from the sensor system from the probability distribution of the multiple latent variables.

2. The prediction device as recited in claim 1, further comprising:
    a vehicle signal interface configured to obtain a vehicle signal, the vehicle signal including at least position information of one or more vehicles in the environment, wherein the trained probabilistic interaction model determines the advanced probability distribution of the multiple latent variables from at least the position information of one or more vehicles in the environment obtained from the vehicle signal.

3. The prediction device as recited in claim 1, wherein the orientation information in the sensor signal includes a body orientation of the pedestrian and/or a head orientation of the pedestrian.

4. The prediction device as recited in claim 1, wherein at least one of the latent variables is a discrete variable, and wherein the advancing of the probability distribution of the discrete latent variable includes applying a function to the discrete latent variable, the function depending on one or more trained parameters.

5. The prediction device as recited in claim 4, wherein the discrete variable is a binary variable.

6. The prediction device as recited in claim 4, wherein the probabilistic interaction model includes multiple motion models configured to advance the probability distribution for a motion variable in the state of a pedestrian, a motion model of the multiple motion models being selected in dependence on one or more discrete latent variables.

7. The prediction device as recited in claim 4, wherein the applying of the function includes computing a feature vector from at least the discrete latent variable, computing a dot-product between the feature vector and a trained parameter vector and applying a sigmoid function to the dot-product.

8. The prediction device as recited in claim 4, wherein the state of a pedestrian includes one or more of the following:
- a binary context awareness variable indicating whether the pedestrian is paying attention to a behavior of vehicles,
- a binary intention variable indicating the pedestrian's intention to cross the road or not, and
- a binary walk/stop variable indicating a switch between a non-zero velocity of the pedestrian and zero velocity of the pedestrian.

9. The prediction device as recited in claim 1, wherein the processor system is configured to:
- obtain a map of the environment, the map including an object within the environment; and
- determine a feature from the position of the one or more pedestrians with respect to a position of the object, wherein the advanced probability distribution of a latent variable is computed from the feature.

10. A computer-implemented prediction method for predicting a location of a pedestrian moving in an environment, the prediction method comprising the following steps:
- obtaining a sensor signal from a sensor system, the sensor signal including at least position and orientation information of one or more pedestrians in the environment;
- storing a probability distribution for multiple latent variables indicating one or more states of the one or more pedestrians, each pedestrian being modeled as a state comprising multiple latent variables;
- advancing the probability distribution of the multiple latent variables to a next time step, the advancing including applying a trained probabilistic interaction model which models conditional independencies among the latent variables, and updating the advanced probability distribution in dependence on at least the position and orientation information of the one or more pedestrians obtained from the sensor signal; and
- predicting a position of a previously sensed pedestrian for which no position information is currently available, from the sensor system from the probability distribution of the multiple latent variables.

11. The prediction method as recited in claim 10, further comprising:
- obtaining a vehicle signal, the vehicle signal including at least position information of one or more vehicles in the environment, wherein the trained probabilistic interaction model determines the advanced probability distribution of the multiple latent variables from at least the position information of one or more vehicles in the environment obtained from the vehicle signal.

12. The prediction method as recited in claim 10, wherein the orientation information in the sensor signal includes a body orientation of the pedestrian and/or a head orientation of the pedestrian.

13. The prediction method as recited in claim 10, wherein at least one of the latent variables is a discrete variable, and wherein the advancing of the probability distribution of the discrete latent variable includes applying a function to the discrete latent variable, the function depending on one or more trained parameters.

14. The prediction method as recited in claim 13, wherein the discrete variable is a binary variable.

15. The prediction method as recited in claim 13, wherein the probabilistic interaction model includes multiple motion models configured to advance the probability distribution for a motion variable in the state of a pedestrian, a motion model of the multiple motion models being selected in dependence on one or more discrete latent variables.

16. The prediction method as recited in claim 13, wherein the applying of the function includes computing a feature vector from at least the discrete latent variable, computing a dot-product between the feature vector and a trained parameter vector and applying a sigmoid function to the dot-product.

17. The prediction method as recited in claim 13, wherein the state of a pedestrian includes one or more of the following:
- a binary context awareness variable indicating whether the pedestrian is paying attention to a behavior of vehicles,
- a binary intention variable indicating the pedestrian's intention to cross the road or not, and
- a binary walk/stop variable indicating a switch between a non-zero velocity of the pedestrian and zero velocity of the pedestrian.

18. The prediction method as recited in claim 10, further comprising:
- obtaining a map of the environment, the map including an object within the environment; and
- determining a feature from the position of the one or more pedestrians with respect to a position of the object, wherein the advanced probability distribution of a latent variable is computed from the feature.

19. A non-transitory computer-readable medium on which is stored data representing instructions for predicting a location of a pedestrian moving in an environment, the stored data representing instructions, when executed by a computer, causing the computer to perform the following steps:
- obtaining a sensor signal from a sensor system, the sensor signal including at least position and orientation information of one or more pedestrians in the environment;
- storing a probability distribution for multiple latent variables indicating one or more states of the one or more pedestrians, each pedestrian being modeled as a state comprising multiple latent variables;
- advancing the probability distribution of the multiple latent variables to a next time step, the advancing including applying a trained probabilistic interaction model which models conditional independencies among the latent variables, and updating the advanced probability distribution in dependence on at least the position and orientation information of the one or more pedestrians obtained from the sensor signal; and
- predicting a position of a previously sensed pedestrian for which no position information is currently available, from the sensor system from the probability distribution of the multiple latent variables.

20. A prediction device for predicting a location of a pedestrian moving in an environment, the prediction device comprising:
- a memory configured to store a probability distribution for multiple latent variables indicating one or more states of one or more pedestrians, the prediction device modelling each pedestrian as a state including multiple latent variables; and
- a processor system configured to iteratively: (i) advance the probability distribution of the multiple latent variables to a next time step, the advancing including applying a trained probabilistic interaction model which models conditional independencies among the latent variables, and (ii) update the advanced probability distribution in dependence on at least position and orientation information of the one or more pedestrians obtained from a sensor signal of a sensor system, and configured to predict a position of a previously sensed pedestrian for which no position information is currently available from the sensor system from the probability distribution of the multiple latent variables.

* * * * *